(12) United States Patent
Beaurepaire et al.

(10) Patent No.: US 11,403,957 B2
(45) Date of Patent: Aug. 2, 2022

(54) METHOD AND APPARATUS FOR ROUTING AN AERIAL VEHICLE BASED ON A RELATIVE NOISE IMPACT

(71) Applicant: HERE GLOBAL B.V., Eindhoven (NL)

(72) Inventors: Jerome Beaurepaire, Berlin (DE); Michele Velastri, Berlin (DE); Dmitry Koval, Berlin (DE); Virva Emila Auvinen, Berlin (DE)

(73) Assignee: HERE Global B.V., Eindhoven (NL)

( * ) Notice: Subject to any disclaimer, the term of this patent is extended or adjusted under 35 U.S.C. 154(b) by 191 days.

(21) Appl. No.: 16/510,467

(22) Filed: Jul. 12, 2019

(65) Prior Publication Data

US 2021/0012669 A1    Jan. 14, 2021

(51) Int. Cl.
G08G 5/00    (2006.01)

(52) U.S. Cl.
CPC .......... G08G 5/0034 (2013.01); G08G 5/006 (2013.01); G08G 5/0091 (2013.01)

(58) Field of Classification Search
CPC combination set(s) only.
See application file for complete search history.

(56) References Cited

U.S. PATENT DOCUMENTS

| | | | |
|---|---|---|---|
| 7,383,104 B2 | 6/2008 | Ishii et al. | |
| 7,584,028 B2 | 9/2009 | Burnside | |
| 8,868,257 B2 | 10/2014 | Kirchhofer et al. | |
| 9,422,055 B1 | 8/2016 | Beckman et al. | |
| 9,483,052 B2 | 11/2016 | McGregor et al. | |
| 9,786,265 B2 | 10/2017 | Beckman et al. | |
| 2019/0114564 A1* | 4/2019 | Ferguson | G06Q 10/06312 |
| 2019/0189016 A1* | 6/2019 | Kubie | G05D 1/0005 |

FOREIGN PATENT DOCUMENTS

| | | | | |
|---|---|---|---|---|
| EP | 0945841 A1 | 9/1999 | | |
| EP | 3288006 A1 | 2/2018 | | |
| FR | 2688316 A1 * | 9/1993 | | G01S 3/20 |

OTHER PUBLICATIONS

Office Action for related European Patent Application No. 20184940. 3-1001, dated Dec. 16, 2020, 8 pages.
Office Action for related European Patent Application No. 20 184 940.3-1001, dated Dec. 20, 2021, 7 pages.

* cited by examiner

*Primary Examiner* — Aniss Chad
*Assistant Examiner* — Chase L Cooley
(74) *Attorney, Agent, or Firm* — Ditthavong, Steiner & Mlotkowski

(57) ABSTRACT

An approach is provided for routing an aerial vehicle based on a relative noise impact. The approach, for example, involves retrieving environmental noise map data for a geographic area. The environmental noise map data indicates existing noise levels measured in the geographic area. The approach also involves determining a vehicle noise characteristic of the aerial vehicle. The approach further involves generating a route for the aerial vehicle over the geographic area based on the relative noise impact of the aerial vehicle while operating over the geographic area. The relative noise impact is computed based on the vehicle noise characteristic relative to the existing noise levels of the environmental noise map data for portions of the geographic area under the route of the aerial vehicle.

19 Claims, 13 Drawing Sheets

METHOD AND APPARATUS FOR ROUTING AN AERIAL VEHICLE BASED ON A RELATIVE NOISE IMPACT

BACKGROUND

The growing use of manned or unmanned aerial vehicles (AVs) has raised concerns about increased aerial traffic noise. This increased noise, for instance, can lead to increased disturbance or stress to the public from noise pollution by these aerial vehicles flying above streets and buildings. Eventually, such concerns may lead to widespread opposition to the commercial or private use of these aerial vehicles. Accordingly, service providers and manufacturers face significant technical challenges to operating these aerial vehicles while also minimizing their noise impacts on populated areas.

SOME EXAMPLE EMBODIMENTS

Therefore, there is a need for an approach for routing an aerial vehicle based on a relative noise impact.

According to one embodiment, a method comprises retrieving environmental noise map data for a geographic area, wherein the environmental noise map data indicates existing noise levels measured in the geographic area. The method also comprises determining a vehicle noise characteristic of the aerial vehicle. The method further comprises generating a route for the aerial vehicle over the geographic area based on the relative noise impact of the aerial vehicle while operating over the geographic area, wherein the relative noise impact is computed based on the vehicle noise characteristic relative to the existing noise levels of the environmental noise map data for portions of the geographic area under the route of the aerial vehicle.

According to another embodiment, an apparatus comprises at least one processor, and at least one memory including computer program code for one or more computer programs, the at least one memory and the computer program code configured to, with the at least one processor, cause, at least in part, the apparatus to retrieve environmental noise map data for a geographic area, wherein the environmental noise map data indicates existing noise levels measured in the geographic area. The apparatus is also caused to determine a vehicle noise characteristic of the aerial vehicle. The apparatus is further caused to generate a route for the aerial vehicle over the geographic area based on the relative noise impact of the aerial vehicle while operating over the geographic area, wherein the relative noise impact is computed based on the vehicle noise characteristic relative to the existing noise levels of the environmental noise map data for portions of the geographic area under the route of the aerial vehicle.

According to another embodiment, a computer-readable storage medium carries one or more sequences of one or more instructions which, when executed by one or more processors, cause, at least in part, an apparatus to retrieve environmental noise map data for a geographic area, wherein the environmental noise map data indicates existing noise levels measured in the geographic area. The apparatus is also caused to determine a vehicle noise characteristic of the aerial vehicle. The apparatus is further caused to generate a route for the aerial vehicle over the geographic area based on the relative noise impact of the aerial vehicle while operating over the geographic area, wherein the relative noise impact is computed based on the vehicle noise characteristic relative to the existing noise levels of the environmental noise map data for portions of the geographic area under the route of the aerial vehicle.

According to another embodiment, an apparatus comprises means for retrieving environmental noise map data for a geographic area, wherein the environmental noise map data indicates existing noise levels measured in the geographic area. The apparatus also comprises means for determining a vehicle noise characteristic of the aerial vehicle. The apparatus further comprises means for generating a route for the aerial vehicle over the geographic area based on the relative noise impact of the aerial vehicle while operating over the geographic area, wherein the relative noise impact is computed based on the vehicle noise characteristic relative to the existing noise levels of the environmental noise map data for portions of the geographic area under the route of the aerial vehicle.

In addition, for various example embodiments of the invention, the following is applicable: a method comprising facilitating a processing of and/or processing (1) data and/or (2) information and/or (3) at least one signal, the (1) data and/or (2) information and/or (3) at least one signal based, at least in part, on (or derived at least in part from) any one or any combination of methods (or processes) disclosed in this application as relevant to any embodiment of the invention.

For various example embodiments of the invention, the following is also applicable: a method comprising facilitating access to at least one interface configured to allow access to at least one service, the at least one service configured to perform any one or any combination of network or service provider methods (or processes) disclosed in this application.

For various example embodiments of the invention, the following is also applicable: a method comprising facilitating creating and/or facilitating modifying (1) at least one device user interface element and/or (2) at least one device user interface functionality, the (1) at least one device user interface element and/or (2) at least one device user interface functionality based, at least in part, on data and/or information resulting from one or any combination of methods or processes disclosed in this application as relevant to any embodiment of the invention, and/or at least one signal resulting from one or any combination of methods (or processes) disclosed in this application as relevant to any embodiment of the invention.

For various example embodiments of the invention, the following is also applicable: a method comprising creating and/or modifying (1) at least one device user interface element and/or (2) at least one device user interface functionality, the (1) at least one device user interface element and/or (2) at least one device user interface functionality based on at least in part on data and/or information resulting from one or any combination of methods (or processes) disclosed in this application as relevant to any embodiment of the invention, and/or at least one signal resulting from one or any combination of methods (or processes) disclosed in this application as relevant to any embodiment of the invention.

In various example embodiments, the methods (or processes) can be accomplished on the service provider side or on the mobile device side or in any shared way between service provider and mobile device with actions being performed on both sides.

For various example embodiments, the following is applicable: An apparatus comprising means for performing a method of any of the claims.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings.

DESCRIPTION OF SOME EMBODIMENTS

Examples of a method, apparatus, and computer program for providing underground and/or interior routing or operation of aerial vehicles are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

Figure 1:
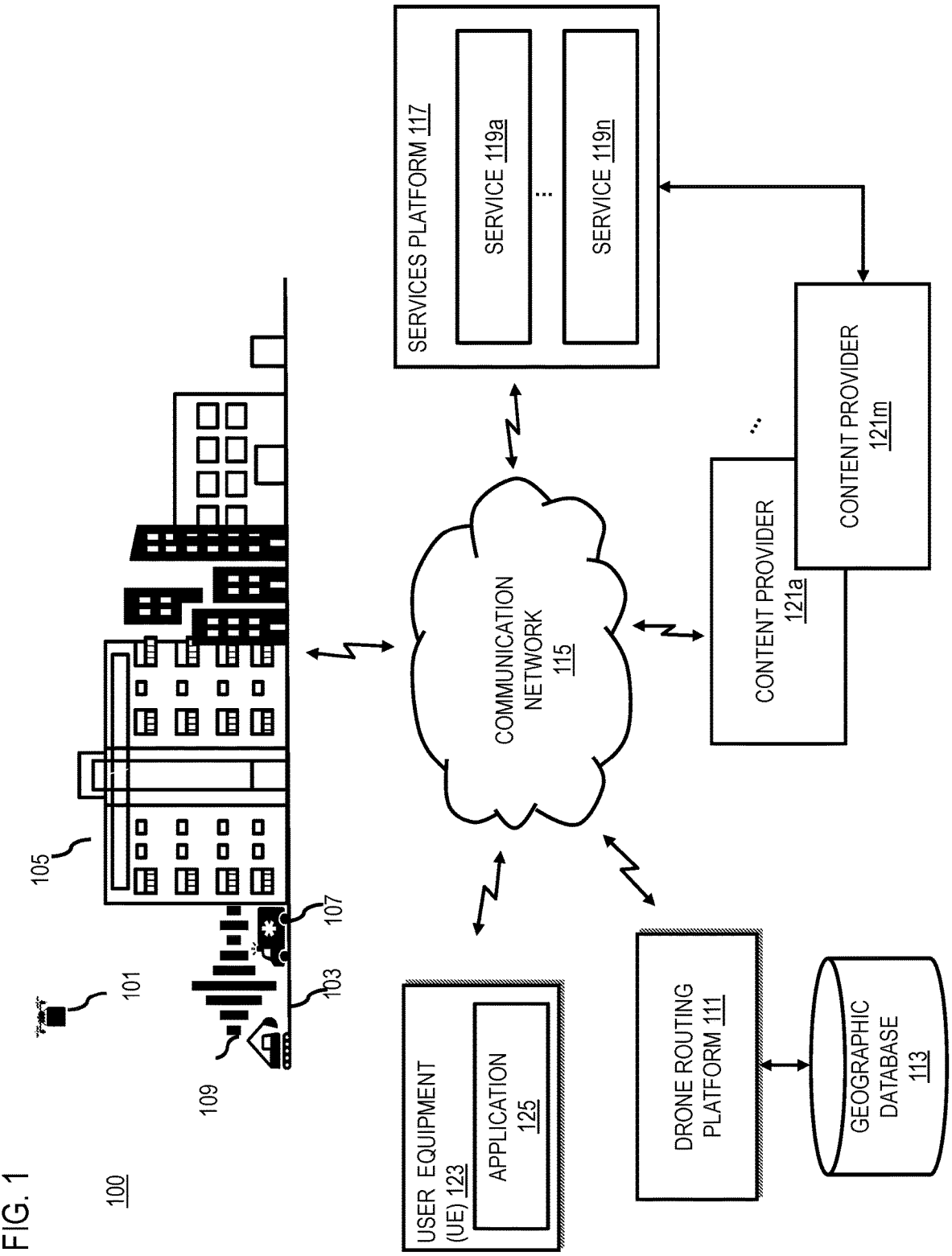
FIG. 1 is a diagram of a system capable of routing an aerial vehicle based on a relative noise impact, according to one embodiment.

FIG. 1 is a diagram of a system capable of routing an aerial vehicle based on a relative noise impact, according to one embodiment. As noted above, the use of manned or unmanned aerial vehicles (AVs) is becoming more widespread. Common examples of manned aerial vehicles include airplanes, helicopters, private jets, etc. Common examples of unmanned aerial vehicles include unmanned aircrafts, unmanned spacecrafts, drones, etc. Generally, an aerial vehicle 101 operates by flying above streets 103, buildings 105, and/or other public spaces where noise restrictions often apply. For example, aerial vehicle flights might have to be limited during night hours to reduce noise pollution and related disturbances during typical sleep or rest times. In another example, aerial vehicle flights might have to be restricted during events (e.g., concerts, sports, etc.) that could affect the event operation. In addition, any crashing or malfunctioning of the aerial vehicle 101 can pose serious threat to people and/or things below the aerial vehicle 101's flight path. Therefore aerial vehicle manufacturers, service providers, operators, etc. face significant technical challenges to reducing the noise pollution, privacy concerns, and/or other detrimental effects of conventionally operating an aerial vehicle 101 in the above ground airspace.

To address this problem, a system 100 of FIG. 1 introduces a capability to route the aerial vehicle 101 based on a relative noise impact to ground level noise sources 107, such as traffic noises, construction noises, police, ambulance and firetruck siren noises, garbage collection noises, factory noises, etc., to minimize its relative contribution to noise pollution 109 one the ground of the flying over area. By routing the aerial vehicle 101 over portions of the area that are already noisy, the system 100 avoids or otherwise mitigates a relative noise impact of aerial vehicle 101 to the ground level noise sources 107. The system 100, for instance, can map the ground level noise sources 107 in respective geographic areas that are available for aerial vehicle operation (e.g., based on the legal restrictions). This map data can then be used to generate aerial vehicle routes or flight plans. In some embodiments, the system 100 can also combine the digital map data of the ground level noise sources 107 with real-time noise data of the ground level noise sources 107 for aerial vehicle operation to determine the routes and/or time slots for aerial vehicle travel.

It is contemplated that the route is generated to minimize the relative noise impact of the aerial vehicle with respect to a noise measurement taken at a ground level. In one embodiment, the relative noise impact is minimized by generating the route to fly over the portions of the geographic area where the existing noise levels are greater than the vehicle noise characteristic by a threshold value. Another way to reduce the noise impact of the aerial vehicle is to modulate the altitude for the areas where the risk of noise impact is higher. In another embodiment, the relative noise impact is minimized by generating the route to fly at an altitude at which the existing noise levels are greater than the vehicle noise characteristic as heard at the ground level by a threshold value. This is not always possible but may be considered by the system 100 to compute a recommended altitude for a portion or the whole fly path in order to limit the noise related impact.

Figure 2A:
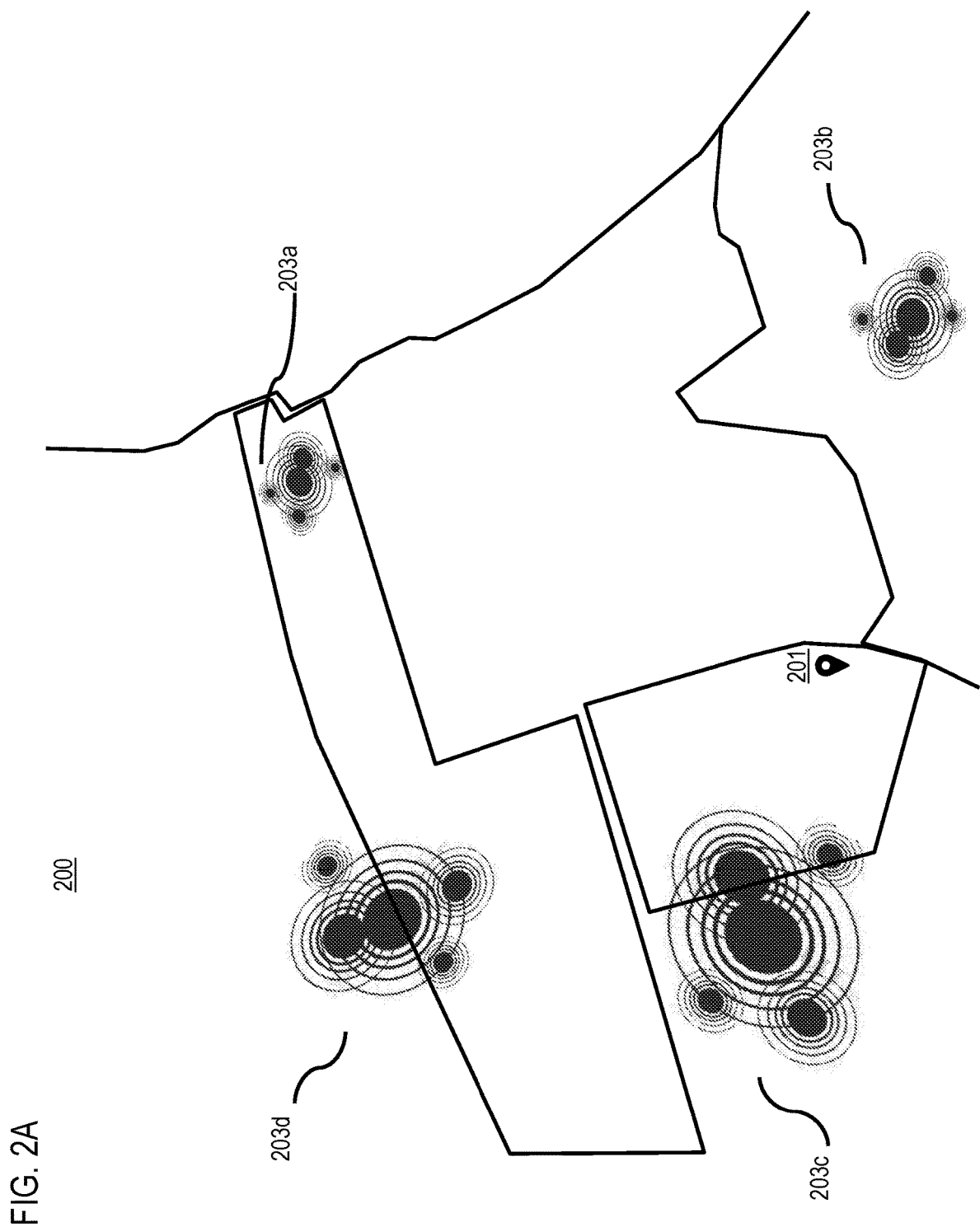
FIGS. 2A and 2B are diagrams illustrating example ground noise sources in a noise map that an aerial vehicle flying over to reach a destination, according to various embodiments.

More specifically, in one embodiment, the system 100 (e.g., via an aerial vehicle routing platform 111) creates digital noise map data (e.g., stored in a geographic database 113) of ground level noise sources 107. In one embodiment, the system 100 deploys on site microphones at different areas to collect ground level noise data. FIG. 2A is a diagram illustrating example ground noise sources in a noise map 200 that an aerial vehicle flying over to reach a destination 201, according to one embodiment. The system 100 analyzes the noise data collected by the microphones and determines four clusters/groups of ground level noise sources 203*a*-203*d* in the area where the destination 201 is located.

Figure 2B:
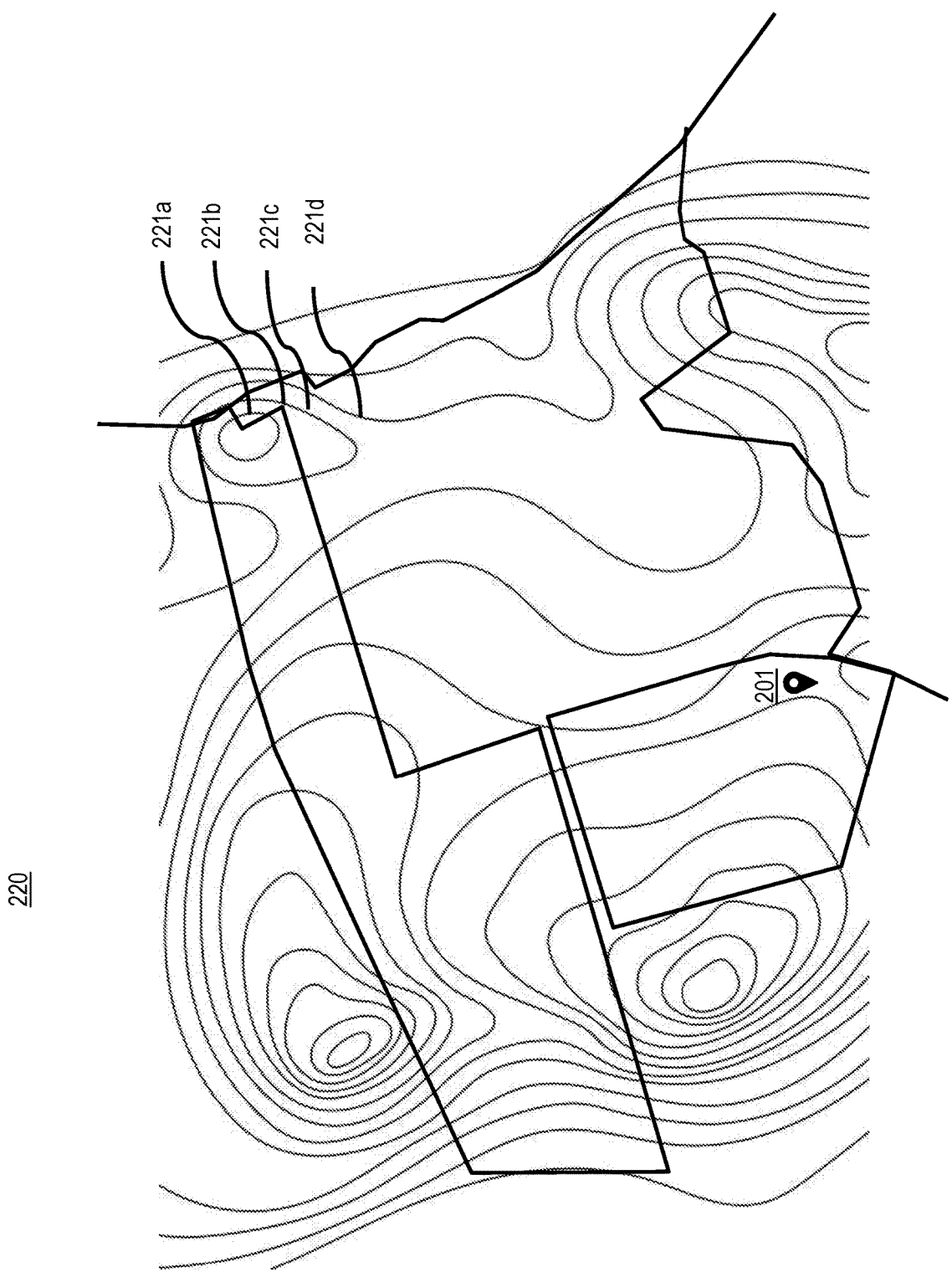

In another embodiment, the system 100 repurposes existing noise map data (e.g., transportation noise map data) as a part of the digital noise map data for routing aerial vehicles. FIG. 2B is a diagram illustrating example ground noise sources in a noise map 220, according to one embodiment. FIG. 2B depicts contours/isolines 221*a*-221*d* of different noise levels, such as 80, 75, 70, 65 dB at a specific time point, corresponding to the clusters/groups of ground level noise sources 203*a*-203*d* in FIG. 2A.

The system 100 computes flying paths for aerial vehicles that minimize their own ground-level relative noise impact. In one embodiment, the system 100 can use the ground noise source data to route the aerial vehicle 101 over the ground level noise sources 203*a*-203*d* based on a relatively small noise impact by the aerial vehicle 101 to ground level noise sources 203*a*-203*d*, such as a ratio of 30% or less. In another embodiment, the system 100 can store and publish the ground noise source data and/or the noise-driven routing data as a data layer of the digital map data of the geographic database 113.

For noise-driven routing, the real-time ground level noise source data can be queried over the communication network 115 from the geographic database 113 and/or other external sources such as, but not limited, the services platform 117, any of the services 119*a*-119*n* (also collectively referred to as services 119 of the services platform 117, content providers 121*a*-121*m* (also collectively referred to as content providers 121), and/or any other equivalent source. The system 100 can then create noise-driven routing data based on a digital map for the aerial vehicle 101. As discussed above, by using noise-driven routing, aerial vehicles 101 can be operated without scientifically contributing to the existing ground level noises.

Figure 3:
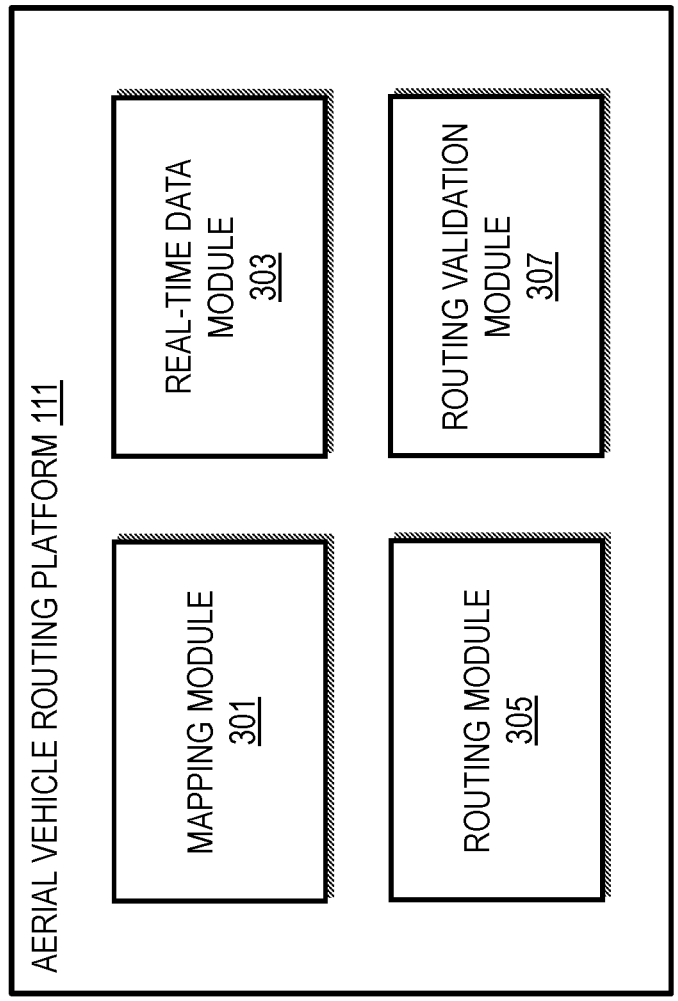
FIG. 3 is a of the components of an aerial vehicle routing platform, according to one embodiment.

In one embodiment, the aerial vehicle routing platform 111 includes one or more components for routing the aerial vehicle 101 based on a relative noise impact to ground level noise sources according to the various embodiments described herein. As shown in FIG. 3, the aerial vehicle routing platform 111 includes a mapping module 301, a real-time data module 303, a routing module 305, and a routing validation module 307. The above presented modules and components of the aerial vehicle routing platform 111 can be implemented in hardware, firmware, software, or a combination thereof. It is contemplated that the functions of these components may be combined or performed by other components of equivalent functionality. Though depicted as a separate entity in FIG. 1, it is contemplated that the aerial vehicle routing platform 111 may be implemented as a module of any of the components of the system 100 (e.g., a component of the aerial vehicle 101 and/or a client device such as user equipment (UE) 123). In another embodiment, the aerial vehicle routing platform 111 and/or one or more of the modules 301-307 may be implemented as a cloud-based service, local service, native application, or combination thereof. The functions of these modules are discussed with respect to FIGS. 4-7 below.

Figure 4:
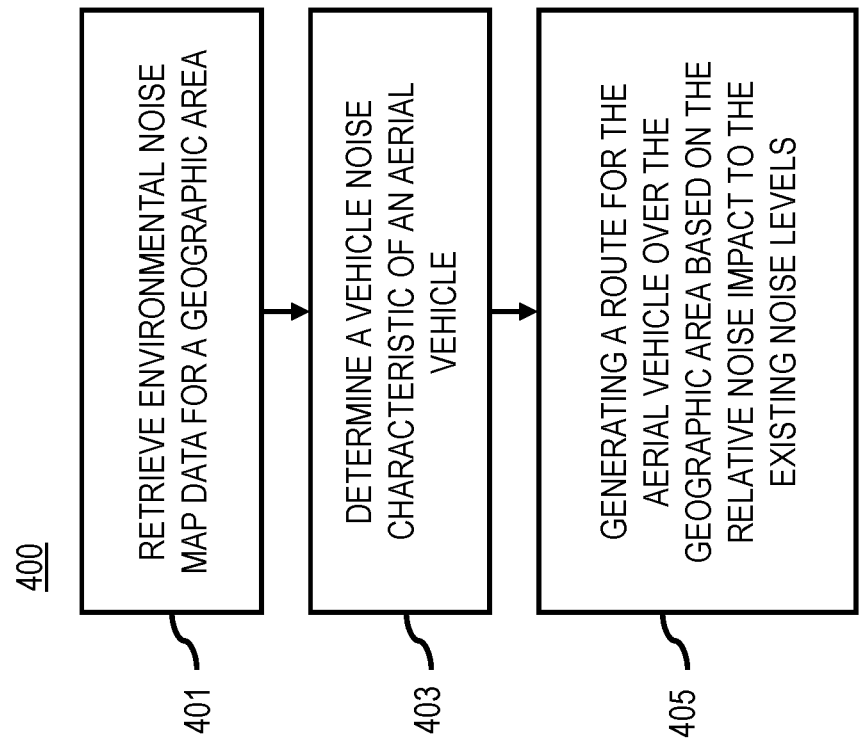
FIG. 4 is a flowchart of a process for routing an aerial vehicle based on a relative noise impact, according to one embodiment.
Figure 10:
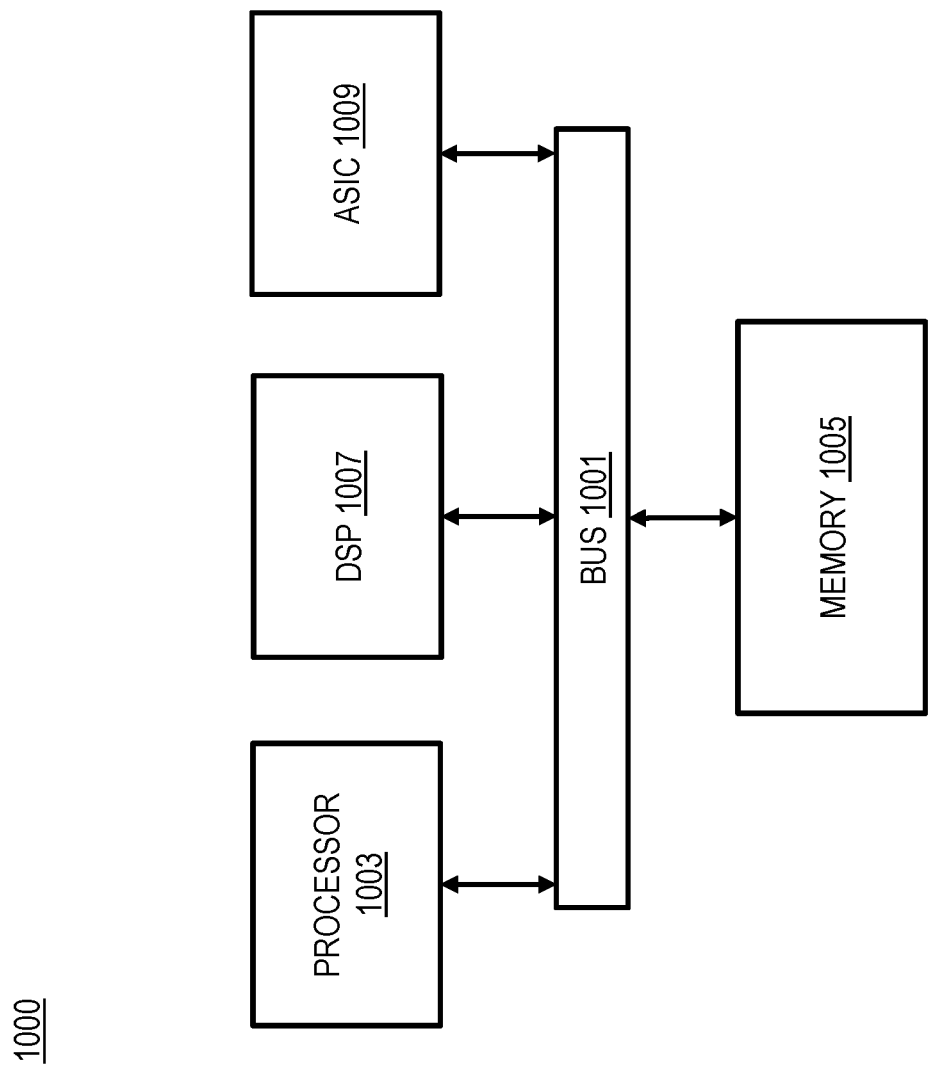
FIG. 10 is a diagram of a chip set that can be used to implement an embodiment.

FIG. 4 is a flowchart of a process for routing an aerial vehicle based on a relative noise impact, according to one embodiment. In various embodiments, the aerial vehicle routing platform 111 and/or any of the modules 301-307 of the aerial vehicle routing platform 111 may perform one or more portions of the process 400 and may be implemented in, for instance, a chip set including a processor and a memory as shown in FIG. 10. As such, the aerial vehicle routing platform 111 and/or the modules 301-307 can provide means for accomplishing various parts of the process 400, as well as means for accomplishing embodiments of other processes described herein in conjunction with other components of the system 100. Although the process 400 is illustrated and described as a sequence of steps, its contemplated that various embodiments of the process 400 may be performed in any order or combination and need not include all of the illustrated steps. More specifically, the process 400 illustrates a process for creating and storing digital map representing the ground level noise sources 107 and/or real-time noise data of the ground level noise sources 107 for aerial vehicle operation to determine routes and/or time slots for aerial vehicle travel or flight.

In one embodiment (e.g., in step 401), the mapping module 301 retrieves environmental noise map data for a geographic area. The environmental noise map data indicates existing noise levels measured in the geographic area. It is contemplated that the mapping module 301 can use any means or data source for existing noise levels in the geographic area. Many sources can be used to estimate/report/model environmental noise levels on the ground, such as road network categorization, life traffic data, people density, microphone measurements, events calendar, etc., based on a time of the day, a day of the week, and/or seasonality. In one embodiment, the mapping module 301 retrieves environmental noise data and/or environmental noise maps compiled in existing databases, such as transportation noise map data from databases of aviation authorities and/or the highway authorities, etc.

In addition or alternatively, the real-time data module 303 retrieves environmental noise data collected by UE 123 (using built-in and/or external microphones), collected by sound level measure devices carried by and/or installed in the ground level noise sources 107 (e.g., transportation vehicles, firetrucks, factories, etc.), collected by private and/or public infrastructures (e.g., surveillance systems, etc.).

The transportation vehicles may include existing mapping vehicles and/or aerial vehicles equipped with sensors (e.g., microphones, sound level sensors, etc.) to capture and/or map environmental noise data. The environmental noise data can be mapped to geographic coordinates to provide a geographically accurate representation of a noise location on a map. The environmental noise data can then be included as a data layer or digital map data of the geographic database 113.

By way of example, the environmental noise map data is generated based on a road network categorization for roads in the geographic area, live traffic data for the roads in the geographic area, a people density in the geographic area, sound measurement data collected in the geographic area, a calendar of events occurring in the geographic area, etc.

It is contemplated that UE 123 may be carried by the general public, including people working in noisy environments, such as factory workers, construction truck drivers, DJs at entertainment venues, etc. In one embodiment, the environmental noise data collected by UE 123 is transmitted to the aerial vehicle routing platform 111 for processing and compiled into an environmental noise map. In another embodiment, the environmental noise data collected by UE 123 is processed locally via a sound level measuring application. By way of example, the existing sound meter applications for smartphones provide noise averages such as Level A-weighted equivalent (LAeq) and Time Weighted, max and peak levels, noise dose, projected dose, etc. according to occupational safety and health standards, and then transited to the aerial vehicle routing platform 111 for to be compiled into an environmental noise map.

In another embodiment, the real-time data module 303 can query the real-time environmental noise data from external databases or services providing the data (e.g., the services platform 117, services 119, content providers 121, etc.), instead of receiving the data from UE 123 and/or the ground level noise sources 107.

In one embodiment, the real-time data module 303 clusters the environmental noise data from all different sources per location, removes corrupted and/or abnormal data points, and uses the remaining data points for an average noise volume at one location in the geographic area at one particular time point.

In step 403, the real-time data module 303 determines a vehicle noise characteristic of the aerial vehicle. By way of example, the noise characteristics of the aerial vehicle include characteristics of the noise emitted by the aerial vehicle, such as a noise volume defined by a sphere of given radius from the aerial vehicle as it is flying at a given height. In one embodiment, the real-time data module 303 uses external sensor data to determines the vehicle noise characteristic of the aerial vehicle, such as a noise volume received on the ground. In another embodiment, the real-time data module 303 estimates the noise volume received on the ground by applying existing flight noise prediction algorisms on noise generation data collected on-board by the aerial vehicle in conjunction with weather conditions (e.g., a wind direction and a wind velocity, a temperature and a density of the atmosphere, etc.), characteristics of the aerial vehicle, flight data (e.g., a flight speed, climb and descent rates, an engine power, a wind direction and a wind velocity, a temperature and a density of the atmosphere, etc.), etc.

By analogy, the real-time data module 303 determines vehicle noise characteristics of a fleet of aerial vehicles flying close together, for example, by real-time or substantially real-time aggerating the vehicle noise characteristics of each aerial vehicles in the fleet based on their relative distances and altitudes. The aggerated noise impact area of the fleet spreads wider than the noise impact area of a single aerial vehicle, and the aggerated noise impact time period of the fleet lasts longer than the noise impact time period of a single aerial vehicle.

It is contemplated that the vehicle noise characteristic of the aerial vehicle(s) can be stored alone or in combination with the environmental noise data in the aerial vehicle routing platform 111, then transmitted to be stored in the digital map data of in the geographic database 113.

In step 405, the routing module 305 generates a route for the aerial vehicle over the geographic area based on a relative noise impact of the aerial vehicle while operating over the geographic area. It is contemplated that the relative noise impact is computed based on the vehicle noise characteristic relative to the existing noise levels of the environmental noise map data for portions of the geographic area under the route of the aerial vehicle. By way of example, the routing module 305 uses a locally relevant ratio of the noise impact on the ground generated by the aerial vehicle over the existing (or averaged) noise on the ground for a given area. Typically, when a given street is very busy, the ratio for a given "link" or portion of the geographic area would be low or close to 1, while this value is much higher when the relative noise impact of the vehicle creates more disturbance. The goal of the noise-driven routing is to minimize the ratio along the flight path taken by the aerial vehicle by adapting the flight path or altitude.

In one embodiment, the routing module 305 minimizes the relative noise impact by generating the route to fly over the portions of the geographic area where the existing noise levels are greater than the vehicle noise characteristic by a threshold value. In another embodiment, the routing module 305 minimizes the relative noise impact by generating the route to fly at an altitude at which the existing noise levels are greater than the vehicle noise characteristic as heard at the ground level by a threshold value.

In yet another embodiment, the routing module 305 selects a route among a plurality of candidate routes generated based on the relative noise impact, by ranking the plurality of candidate routes based on one or more ranking criteria and presenting the ranked plurality of candidate routes in a user interface. The one or more ranking criteria may include a fastest route, a shortest route, a least noise impact on the ground level route, or an optimal route which weights some of the fastest, shortest, and least noise impact criteria.

Based on the information collected by the mapping module 301 and the real-time data module 303, the routing module 305 computes flying paths based on noise statistics to optimize a path of least relative noise impact. The routing module 305 then presents a fastest route, a shortest route, a least noise impact on the ground level route, and an optimal route (which weights some of the fastest, shortest, and least noise impact criteria) to a user for selection.

By analogy, the routing module 305 generates routes for the aerial vehicle fleet over the geographic area based on an aggerated e noise impact of the aerial vehicle fleet while operating over the geographic area. By way of example, the routing module 305 routes the aerial vehicles apart from one another by a threshold distance to spread the aggerated noise impact and minimize the aggerated noise impact on the geographic area.

Figure 5A:
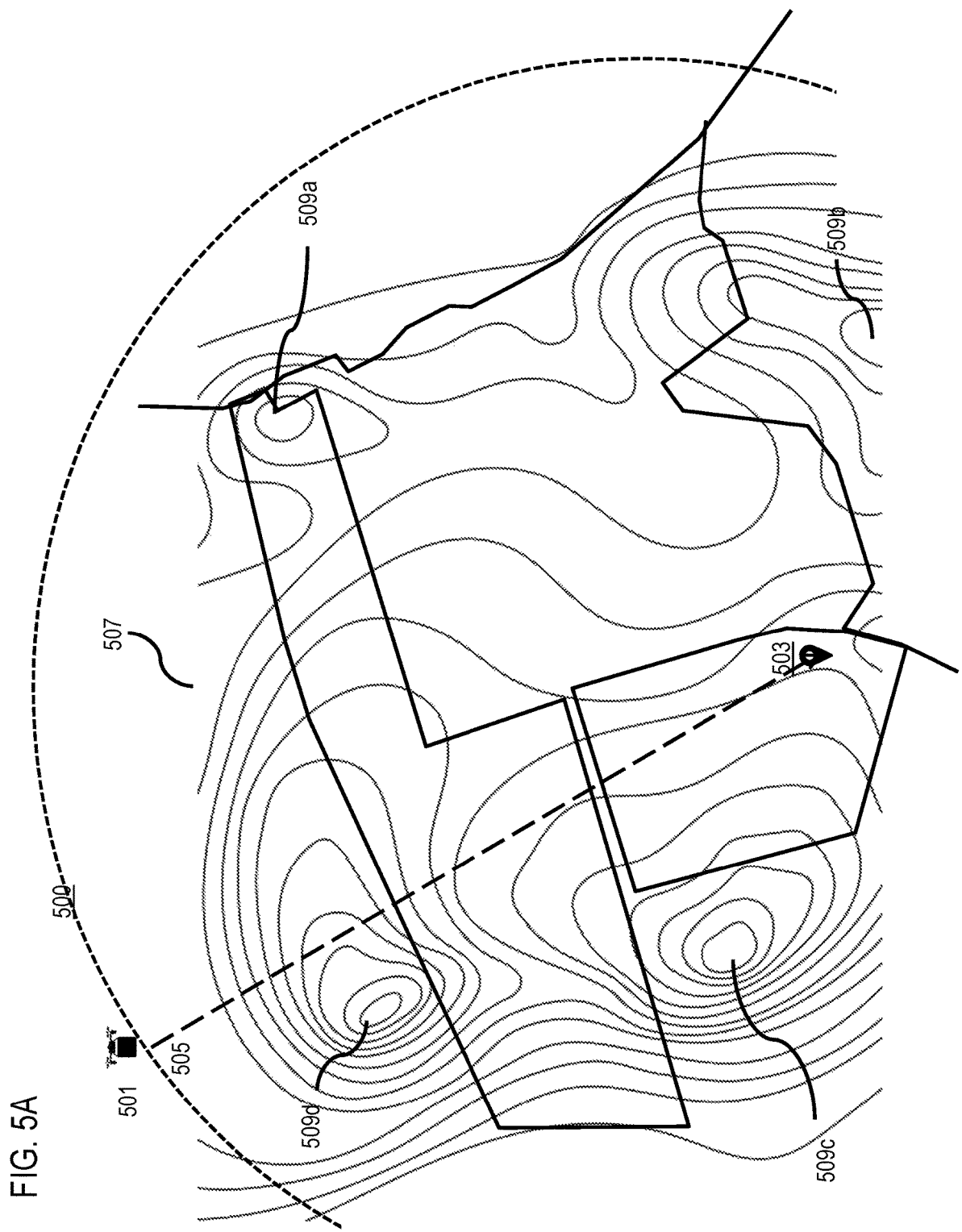
FIGS. 5A-5B are diagrams of example mapping user interfaces for routing an aerial vehicle according to a noise map, according to various embodiments.
Figure 5B:
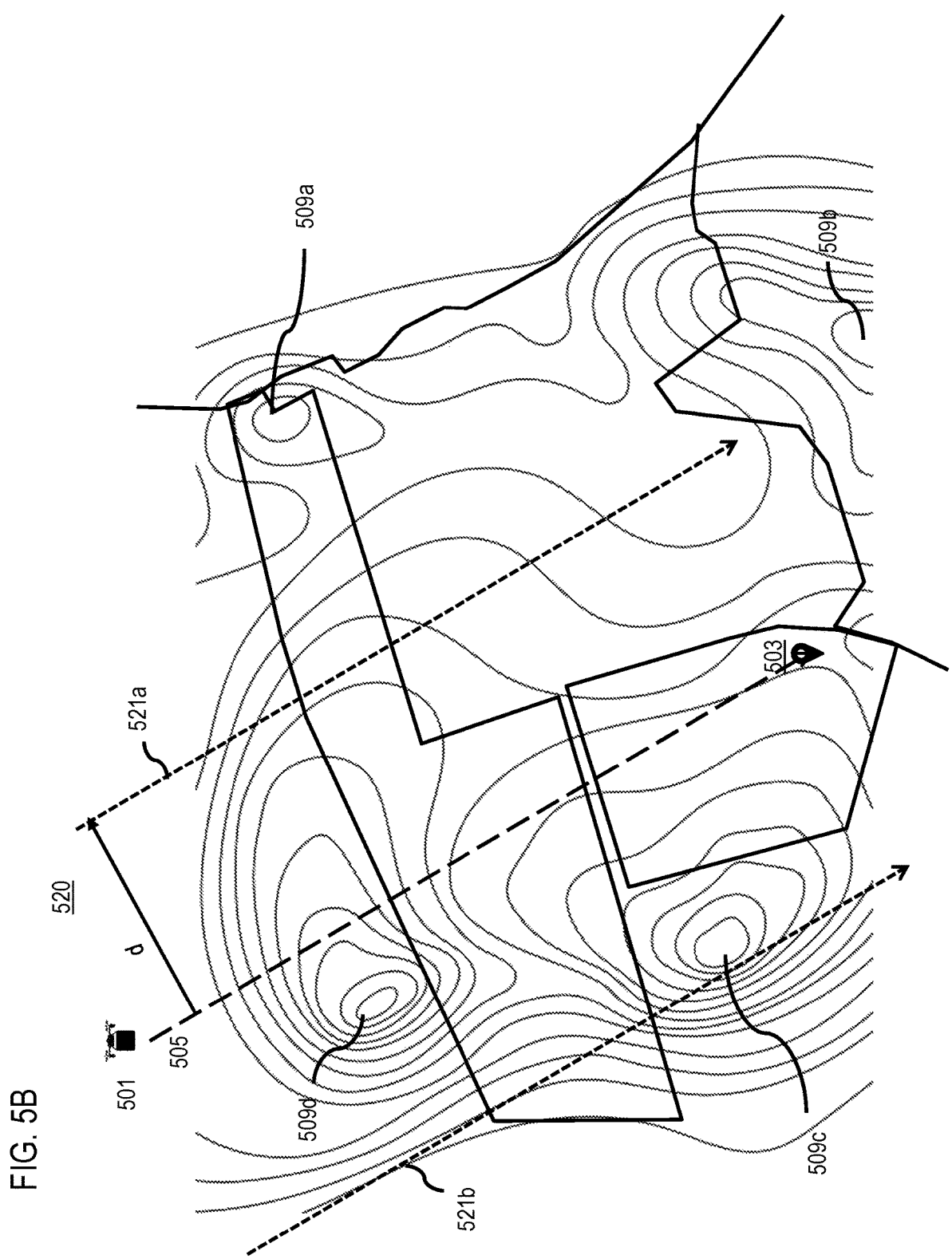

FIGS. 5A-5B are diagrams of example mapping user interfaces for routing an aerial vehicle in a noise map, according to various embodiments. In a scenario where an aerial vehicle 501 needs to reach a destination 503 in the user interface 500 of FIG. 5A, the shortest distance route is a bee line 505, assuming there is no physical obstruction (e.g., high-rise buildings, mountains, etc.) or legal restriction (e.g., no-fly zones, border controls, etc.) on the flight route, to simplify the discussion. In FIG. 5A, there is no noise source located on the bee line 505, the routing module 305 draws a circle 507 with a diameter equal to a distance between the aerial vehicle 501 and the destination 503, to narrow down the number of noise sources in the geographic area depicted in the user interface 500 of FIG. 5A for subsequent computation. The routing module 305 only computes for noise sources 509a-509d within the circle 507 to determine which noise source(s) that meets a noise threshold and a detour threshold from the bee line 505. In other embodiments, the routing module 305 uses another shape in place of the circle 507, such as polygons (e.g., a triangle, a square, etc.), irregular polygons, etc.

In FIG. 5B, the routing module 305 draws a noise band 521 with a horizontal distance d from the bee line 505 as defined by a pair of straight lines 521a, 521b. The routing module 305 then computes for noise source 509c-509d within the noise band 521 to determine which noise source(s) that meets a noise threshold and a detour threshold from the bee line 505. In other embodiments, the routing module 305 uses other shape of lines in place of the straight lines 521a, 521b to define a noise band.

Figure 6:
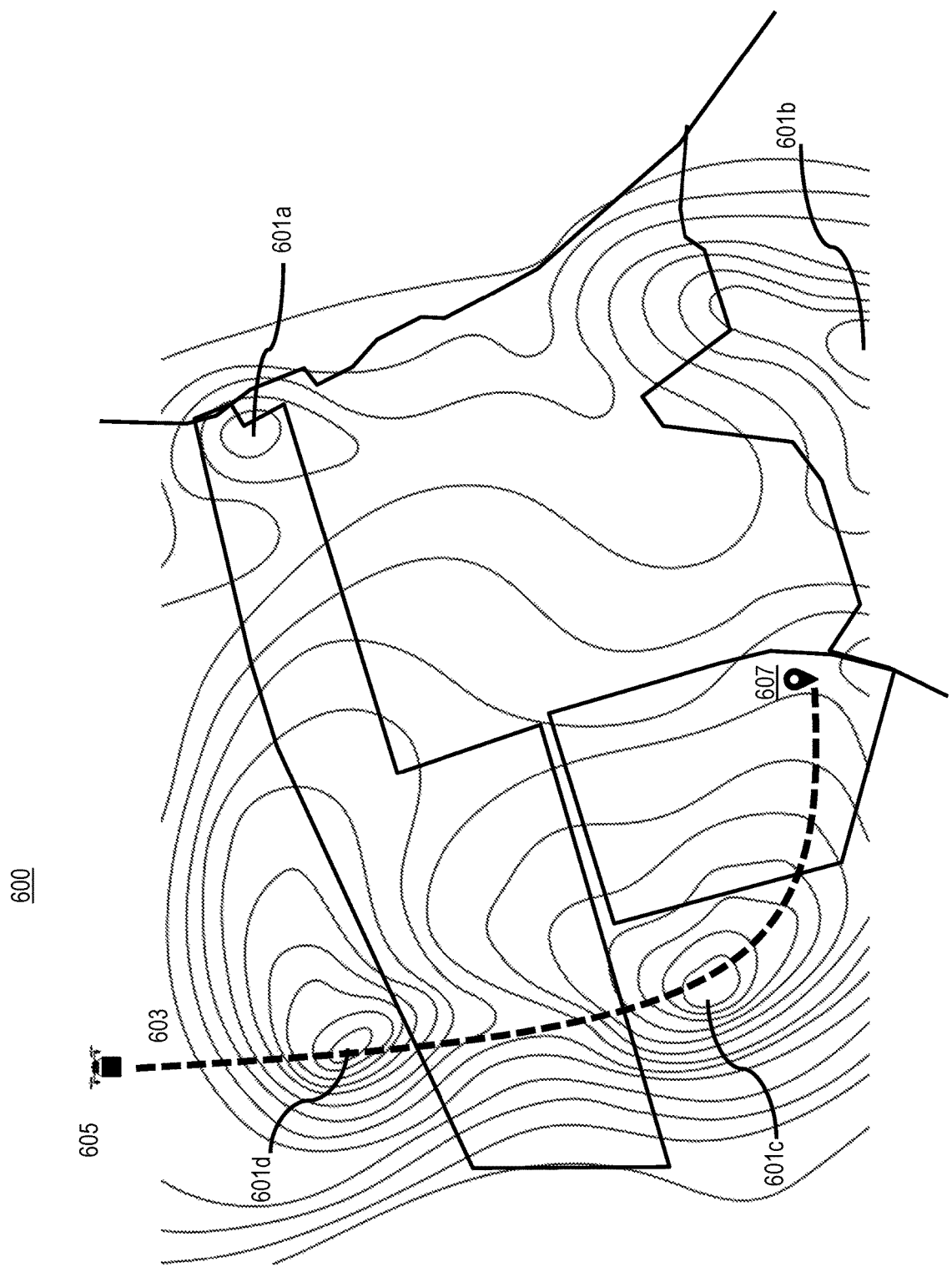
FIG. 6 is a diagram of an example mapping user interface of a navigation route for an aerial vehicle in a noise map, according to one embodiment.

FIG. 6 is a diagram of an example mapping user interface of a navigation route for an aerial vehicle in a noise map, according to one embodiment. Referring to the example in FIG. 5A, only noise source 601c-601d within the circle 507 meet a noise threshold and a detour threshold from the bee line 505. The routing module 305 draws a navigation route 603 passing noise sources 601c-601d for an aerial vehicle 605 to reach a destination 607 a user interface 600 of FIG. 6. Referring to the example in FIG. 5B, both noise source 601c-601d within the noise band 521 meet a noise threshold and a detour threshold from the bee line 505. The routing module 305 thus draws the same navigation route 603 passing noise sources 601c-601d for the aerial vehicle 605 to reach the destination 607 in the user interface 600.

In other embodiments, there are one or more noise sources located on the bee line between the aerial vehicle and the destination; however, a distance between the aerial vehicle and a noise source on the bee line, a distance between two noise sources on the bee line, or a distance between a noise source on the bee line and the destination can be long enough (i.e., longer than a threshold distance) to accommodate a detour to pass via at least one noise source located away from the bee line. In these embodiments, the routing module 305 applies the circle in FIG. 5A or the noise band in FIG. 5B, or the like on the aerial vehicle and the noise source on the bee line, the two noise sources on the bee line, or the noise source on the bee line and the destination to narrow down the number of noise sources in the geographic area for computing against a noise threshold and a detour threshold from the bee line, and determines qualified noise sources to form the navigation route as discussed previously.

In other embodiments, the routing module 305 considers multiple destinations based on the above-discussed embodiments. By way of example, the aerial vehicle needs to drop off passengers and/or products at various locations. In this instance, the routing module 305 minimizes the relative noise impact by generating the route to fly over the portions of the geographic area including all the destinations where the existing noise levels are greater than the vehicle noise characteristic by a threshold value.

In yet another embodiment, the routing module 305 considers round trip routing for the aerial vehicle based on the above-discussed embodiments. By way of example, the aerial vehicle needs to reach a destination and then return back to a starting location. In this instance, the routing module 305 minimizes the relative noise impact by generating a going route over first portions of the geographic area and a returning route over second portions of the geographic area. Since the noise map is a function of time, the noise map for flying from A to B may differ from the noise map for flying from B to A, the routing module 305 considers the total noise for the round trip.

Different buildings may have different in-building noise levels due to their noise insulation. For example, areas with newer buildings and better noise protection would generally suffer less from aerial vehicle noise, hence the total noise impact in such area would be lower than in some other areas. In this instance, the routing module 305 minimizes the relative noise impact by generating the route to fly over the portions of the geographic area including the newer buildings where the existing noise levels are greater than the vehicle noise characteristic by a threshold value.

In other embodiments, a three-dimensional navigation route is computed for aerial vehicles flying at low altitudes (when flying height plays a more important role in noise propagation to the ground), instead of a two-dimensional navigation route for aerial vehicles flying at high altitudes. By way of example, a product-delivery drone can fly along a vertical building wall passing via some windows with loud noises. As another example, the product-delivery drone flies over rooftops of different heights and with different levels of noise existing therein.

In other embodiments, instead of noise-driven routing, the routing module 305 applies music-adverse routing. The routing module 305 retrieves environmental music map data for a geographic area. The environmental music map data indicates existing music levels measured in the geographic area. The routing module 305 determines a vehicle sound characteristic of the aerial vehicle. The routing module 305 generates a route for the aerial vehicle over the geographic area based on the relative sound impact of the aerial vehicle while operating over the geographic area, e.g., by avoiding portion of the geographic area with a relative high level of music (such as an open air concert, a bird chirping garden, etc.). The relative sound impact is computed based on the vehicle sound characteristic relative to the existing sound levels of the environmental music map data for portions of the geographic area under the route of the aerial vehicle. By way of example, the product-delivery drone can fly over treetops of different heights and different levels of music (e.g., depending on the number of birds chirping therein).

In other embodiments, instead of noise-driven routing, the routing module 305 applies silence-adverse routing. The routing module 305 retrieves environmental sound map data for a geographic area. The environmental sound map data indicates existing sound levels measured in the geographic area. The routing module 305 determines a vehicle sound characteristic of the aerial vehicle. The routing module 305 generates a route for the aerial vehicle over the geographic area based on the relative sound impact of the aerial vehicle while operating over the geographic area, e.g., by avoiding portion of the geographic area with no or a relative low level of sound (such as a library, etc.). The relative sound impact is computed based on the vehicle sound characteristic relative to the existing sound levels of the environmental music map data for portions of the geographic area under the route of the aerial vehicle.

After generating the route, the routing module 305 can provide the route to the aerial vehicle. For example, the generated route or multiple candidate routes can be transmitted to the aerial vehicle or a device of the aerial vehicle operator (e.g., UE 123 via an application 125 for controlling the aerial vehicle 101) for selection or execution by the aerial vehicle.

In one embodiment, the routing module 305 selects among a noise-driven routing mode, a music-adverse routing mode, and a silence-adverse routing mode for the aerial vehicle, based on a user input. In another embodiment, the routing module 305 selects among the noise-driven routing mode, the music-adverse routing mode, and the silence-adverse routing mode for the aerial vehicle, based on a type of the aerial vehicle, a model of the aerial vehicle, a total load of the aerial vehicle, profile and preference data of one or more users of the aerial vehicle, characteristics of products delivered by the aerial vehicle, etc.

In one embodiment, the routing validation module 307 monitors in real-time a measured noise impact of the aerial vehicle as the aerial vehicle flies along the route. The measured noise impact is determined by one or more audio sensors located on the ground level. The routing validation module 307 further updates the environmental noise map data, the vehicle noise characteristic, and/or a noise model for future computations, based on the measured noise impact of the aerial vehicle.

By way of example, the routing validation module 307 monitors a measured noise impact of the aerial vehicle via monitoring the environmental noise data collected by UE 123, collected by sound level measure devices carried by and/or installed in the ground level noise sources 107, and/or collected by private and/or public infrastructures (e.g., surveillance systems, etc.), to validate the impact of each aerial vehicle in real-time based on the positions of each aerial vehicle. The routing validation module 307 creates validation loops to determine whether that the computed navigation routes are working as intended. If the perceived noise level on the ground is higher than expected, the routing validation module 307 transmits the results to the routing module 305 for future improvement of the route computations.

Figure 7:
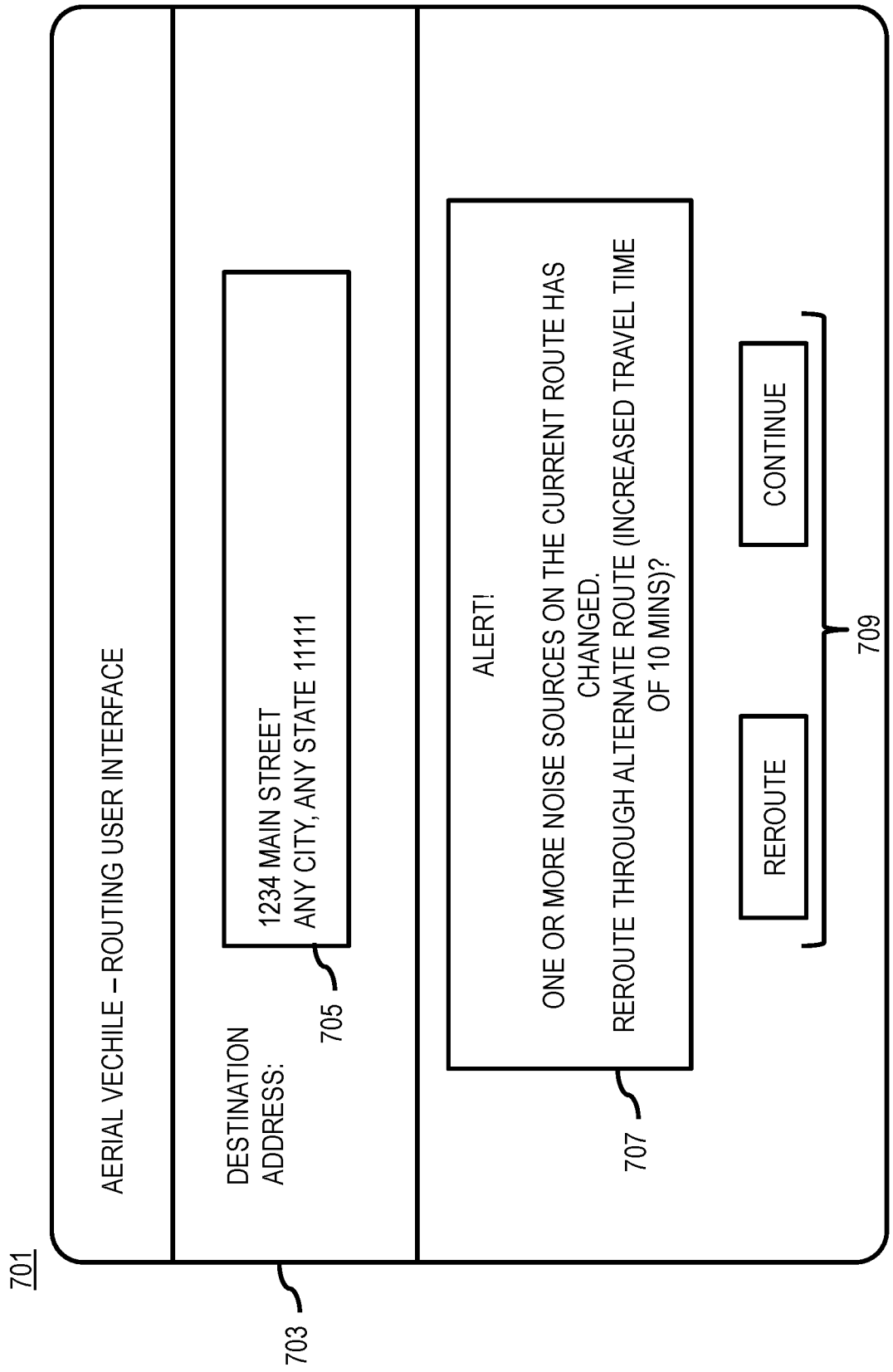
FIG. 7 is a diagram illustrating an example user interface for requesting a navigation route for an aerial vehicle, according to one embodiment.

FIG. 7 is a diagram illustrating an example user interface for requesting a navigation route for an aerial vehicle, according to one embodiment. As shown, a UI 701 provides a user interface element 703 or window for entering a destination location 705 for an aerial vehicle (e.g., an aerial vehicle or UAV). On inputting an address 705, the aerial vehicle routing platform 111 generates a navigation route using the environmental noise map data (e.g., as stored in the geographic database 113). In this example, the aerial vehicle routing platform 111 calculates that the shortest route from the present location of the aerial vehicle to the destination address is through two noise sources. However, the real-time data collected by the aerial vehicle routing platform 111 indicates one or more real-time parameter changes (e.g., a wind direction, a beginning or an ending of an event, a change in traffic, etc.) that can affect the existing noise level, the vehicle noise characteristic, or a combination thereof, and updates the route in real time based on the one or more real-time parameter changes. Based on this, the aerial vehicle routing platform 111 presents an alert message 707 providing an alternative route through one or more different noises. The aerial vehicle routing platform 111 calculates that the alternative route would increase the estimated time of arrival by 10 mins and presents the aerial vehicle operator with options 709 to accept the alternative route or continue the existing route.

The above-discussed embodiments allow aerial vehicles to reduce their relative noise footprint by considering the already existing environmental noise in that area and reduce the noise impact of the aerial vehicles for people on the ground by flying over one or more environmental noise sources.

The above-discussed embodiments combine different technologies (sensors, 3D routing, ground noise mapping, altitude computations, real-time aerial vehicle noise modelling, aerial vehicle positioning capabilities, probability computation, risk computation, machine learning, big data analysis, etc.) to provide least noise impact routing recommendation via a noise map.

Returning to FIG. 1, as shown, the system 100 comprises an aerial vehicle 101 equipped with a variety of sensors that is capable operating in a noise-driven routing mode, a music-adverse routing mode, and/or a silence-adverse routing mode. In one embodiment, the aerial vehicle 101 can fly or otherwise operate autonomously or under direct control via the UE 123 that may include or be associated with one or more software applications 125 supporting the noise source mapping and the aerial vehicle routing according to the embodiments described herein. As previously discussed, the system 100 further includes aerial vehicle routing platform 111 coupled to the geographic database 113, wherein the aerial vehicle routing platform 111 is performs the functions associated with the noise source mapping and the aerial vehicle routing as discussed with respect to the various embodiments described herein. In one embodiment, the aerial vehicle 101, aerial vehicle routing platform 111, UE 123, and other components of the system 100 have connectivity to each other via the communication network 115.

In one embodiment, the aerial vehicle 101 is a UAV capable of operating autonomously or via a remote pilot using UE 123 to fly the aerial vehicle 101 or configure a flight path or route for the aerial vehicle 101. In one embodiment, the aerial vehicle 101 is configured to travel using one or more modes of operation through the noise source mapping and the aerial vehicle routing. The aerial vehicle 101 many include any number of sensors including cameras, recording devices, communication devices, etc. By way example, the sensors may include, but are not limited to, a global positioning system (GPS) sensor for gathering location data based on signals from a positioning satellite, Light Detection And Ranging (LIDAR) for gathering distance data and/or generating depth maps, a network detection sensor for detecting wireless signals or receivers for different short-range communications (e.g., Bluetooth®, Wireless Fidelity (Wi-Fi), Li-Fi, Near Field Communication (NFC), etc.), temporal information sensors, a camera/imaging sensor for gathering image data, and the like. The aerial vehicle 101 may also include recording devices for recording, storing, and/or streaming sensor and/or other telemetry data to the UE 123 and/or the aerial vehicle routing platform 111 for the noise source mapping and the aerial vehicle routing.

In one embodiment, the aerial vehicle 101 is capable of being configured with and executing the noise source mapping and the aerial vehicle routing according to the embodiments described herein. The aerial vehicle can also be configured avoid objects (e.g., trains, pedestrians, elevators, etc.) and/or obstructions (e.g., high water levels) in the navigation route. In addition, the aerial vehicle 101 can be configured to observe restricted paths or routes. For example, the restricted paths may be based on governmental regulations that govern/restrict the path that the aerial vehicle 101 may fly (e.g., Federal Aviation Administration (FAA) policies regarding required distances between objects). In one embodiment, the system 100 may also take into account one or more pertinent environmental or weather conditions (e.g., rain, water levels, sheer winds, etc. in and around underground passageways and their entry/exit points) in determining a navigation route or flight path.

In one embodiment, the aerial vehicle 101 may determine contextual information such as wind and weather conditions in route that may affect the aerial vehicle 101's ability to follow the specified navigation route to pass over one or more noise sources (e.g., using one or more onboard sensors) and then relay this information in substantially real-time to the system 100 for validation. In one embodiment, the aerial vehicle 101 may request one or more modifications of the flight path based, at least in part, on the determination of the contextual information or a change in the real-time conditions of the noise sources (e.g., dynamic features such as changed public transport schedules, unexpected weather conditions causing a noisy factory showdown, etc.). In one embodiment, the system 100 creates a data object to represent the navigation route and may automatically modify the route data object based on receipt of the contextual information from the aerial vehicle 101 or another source and then transmit the new route object to the aerial vehicle 101 for execution. In one embodiment, the aerial vehicle 101 can determine or access the new route data object and/or determine or access just the relevant portions and adjust its current path accordingly. For example, in a situation that a noisy factory showdown, the system 100 may reroute the aerial vehicle 101's flight path to fly over a different noise source.

By way of example, a UE 123 is any type of dedicated UAV/aerial vehicle control unit, mobile terminal, fixed terminal, or portable terminal including a mobile handset, station, unit, device, multimedia computer, multimedia tablet, Internet node, communicator, desktop computer, laptop computer, notebook computer, netbook computer, tablet computer, personal communication system (PCS) device, personal navigation device, personal digital assistants (PDAs), audio/video player, digital camera/camcorder, positioning device, television receiver, radio broadcast receiver, electronic book device, game device, or any combination thereof, including the accessories and peripherals of these devices, or any combination thereof. It is also contemplated that a UE 123 can support any type of interface to the user (such as "wearable" circuitry, etc.). In one embodiment, a UE 123 may support any type of interface for piloting or routing the aerial vehicle 101. In addition, a UE 123 may facilitate various input means for receiving and generating information, including, but not restricted to, a touch screen capability, a keyboard and keypad data entry, a voice-based input mechanism, and the like. Any known and future implementations of a UE 123 may also be applicable.

By way of example, the UE 123 and/or the aerial vehicle 101 may execute applications 125, which may include various applications such as a noise-driven routing application, a location-based service application, a navigation application, a content provisioning application, a camera/imaging application, a media player application, an e-commerce application, a social networking application, and/or the like. In one embodiment, the applications 125 may include one or more feature recognition applications used for identifying or mapping sound features or routes according to the embodiments described herein. In one embodiment, the application 125 may act as a client for the aerial vehicle routing platform 111 and perform one or more functions of the aerial vehicle routing platform 111. In one embodiment, an application 125 may be considered as a Graphical User Interface (GUI) that can enable a user to configure an underground route or flight path for execution by aerial vehicle 101 according to the embodiments described herein.

In one embodiment, the communication network 115 of system 100 includes one or more networks such as a data network, a wireless network, a telephony network, or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (WiFi), wireless LAN (WLAN), Bluetooth®, Internet Protocol (IP) data casting, satellite, mobile ad-hoc network (MANET), and the like, or any combination thereof.

In one embodiment, the aerial vehicle routing platform 111 can interact with the services platform 117 to receive data (e.g., environmental noise map data, aerial vehicle noise characteristic data, real-time data about the environmental noise sources, etc.) for providing noise-driven routing or operation of the aerial vehicle 101. By way of example, the services platform 117 may include one or more services 119 for providing content (e.g., 3D object models of passageways, LIDAR data, underground passageway cartography data, 2D/3D imagery, etc.), provisioning services, application services, storage services, mapping services, navigation services, contextual information determination services, location-based services, information-based services (e.g., weather), etc. By way of example, the services 119 may provide or store non-aerial vehicle traffic schedule data (e.g., train/subway schedules, elevator schedules, etc.), weather data, and/or other data used by the embodiments describe herein. In one embodiment, the services platform 117 may interact with the aerial vehicle 101, UE 123, and/or aerial vehicle routing platform 111 to supplement or aid in processing of the noise source mapping and/or noise-driven routing information.

By way of example, the aerial vehicle 101, UE 123, aerial vehicle routing platform 111, and the services platform 117 communicate with each other and other components of the system 100 using well known, new or still developing protocols. In this context, a protocol includes a set of rules defining how the network nodes within the system 100 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application (layer 5, layer 6 and layer 7) headers as defined by the OSI Reference Model.

Figure 8:
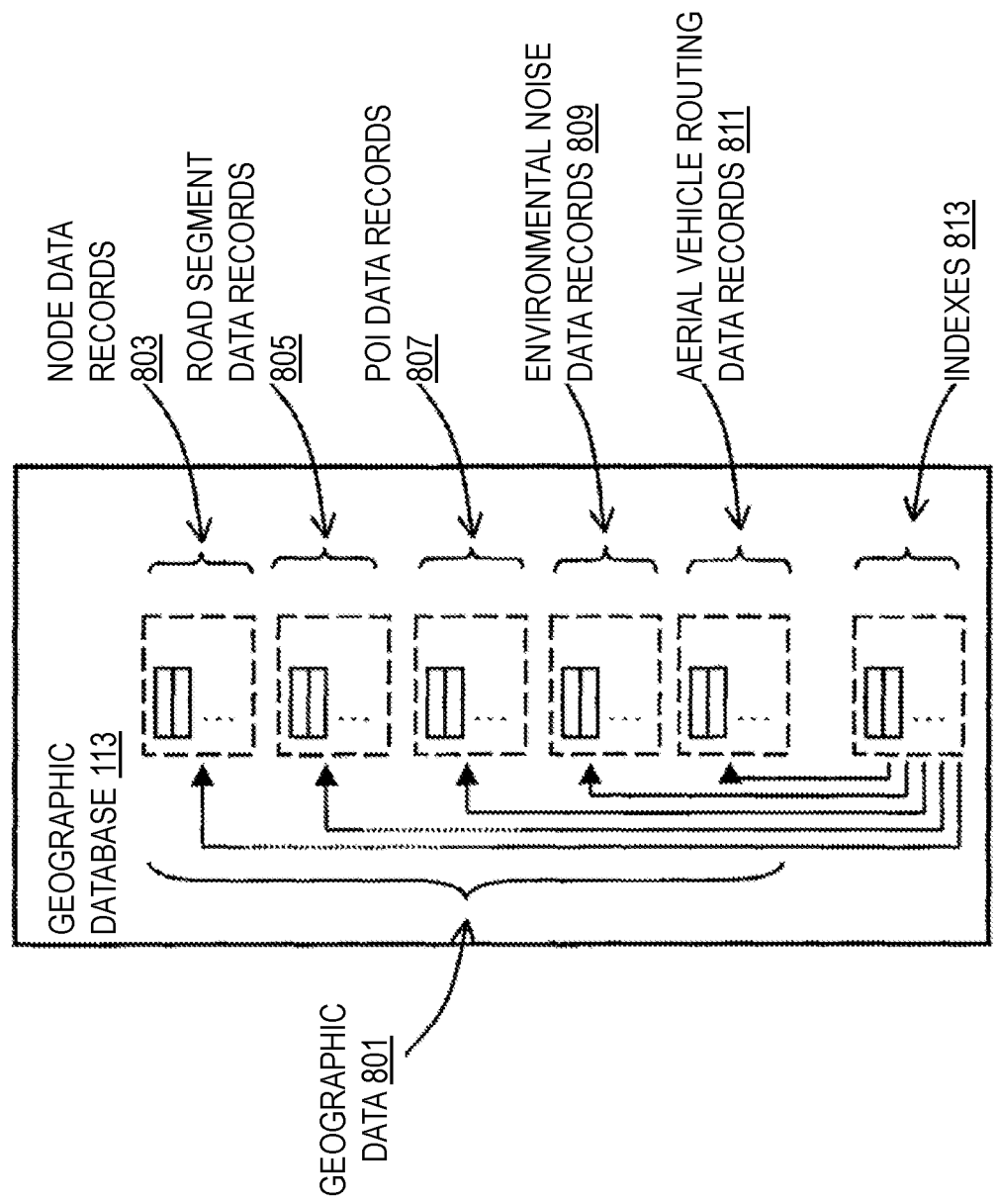
FIG. 8 is a diagram of a geographic database capable of storing map data for routing an aerial vehicle based on a relative noise impact, according to one embodiment.

FIG. 8 is a diagram of a geographic database 113 capable of storing map data for environmental noise source mapping and noise-driven routing, according to one embodiment. In one embodiment, the geographic database 113 includes geographic data 801 used for (or configured to be compiled to be used for) mapping and/or navigation-related services, such as for routing aerial vehicles to create a 3D flightpath or route. In one embodiment, the 3D flightpath or route is executed an aerial vehicle 101 for package delivery to a target delivery location (e.g., a balcony or other location in a target building). For example, the geographic database 801 stores model data (e.g., 3D object models of underground passageways and their entry/exit points) among other related data.

In one embodiment, geographic features (e.g., two-dimensional or three-dimensional features) are represented using polygons (e.g., two-dimensional features) or polygon extrusions (e.g., three-dimensional features). For example, the edges of the polygons correspond to the boundaries or edges of the respective geographic feature. In the case of a building, a two-dimensional polygon can be used to represent a footprint of the building, and a three-dimensional polygon extrusion can be used to represent the three-dimensional surfaces of the building. It is contemplated that although various embodiments are discussed with respect to two-dimensional polygons, it is contemplated that the embodiments are also applicable to three-dimensional polygon extrusions, models, routes, etc. Accordingly, the terms polygons and polygon extrusions/models as used herein can be used interchangeably.

In one embodiment, the following terminology applies to the representation of geographic features in the geographic database 113.

"Node"—A point that terminates a link.

"Line segment"—A straight line connecting two points.

"Link" (or "edge")—A contiguous, non-branching string of one or more line segments terminating in a node at each end.

"Shape point"—A point along a link between two nodes (e.g., used to alter a shape of the link without defining new nodes).

"Oriented link"—A link that has a starting node (referred to as the "reference node") and an ending node (referred to as the "non reference node").

"Simple polygon"—An interior area of an outer boundary formed by a string of oriented links that begins and ends in one node. In one embodiment, a simple polygon does not cross itself.

"Polygon"—An area bounded by an outer boundary and none or at least one interior boundary (e.g., a hole or island). In one embodiment, a polygon is constructed from one outer simple polygon and none or at least one inner simple polygon. A polygon is simple if it just consists of one simple polygon, or complex if it has at least one inner simple polygon.

In one embodiment, the geographic database 113 follows certain conventions. For example, links do not cross themselves and do not cross each other except at a node. Also, there are no duplicated shape points, nodes, or links. Two links that connect each other have a common node. In the geographic database 113, overlapping geographic features are represented by overlapping polygons. When polygons overlap, the boundary of one polygon crosses the boundary of the other polygon. In the geographic database 113, the location at which the boundary of one polygon intersects they boundary of another polygon is represented by a node. In one embodiment, a node may be used to represent other locations along the boundary of a polygon than a location at which the boundary of the polygon intersects the boundary of another polygon. In one embodiment, a shape point is not used to represent a point at which the boundary of a polygon intersects the boundary of another polygon.

As shown, the geographic data 801 of the database 113 includes node data records 803, road segment or link data records 805, POI data records 807, environmental noise data records 809, aerial vehicle routing data records 811, and indexes 813, for example. More, fewer or different data records can be provided. In one embodiment, additional data records (not shown) can include cartographic ("carto") data records, routing data, and maneuver data. In one embodiment, the indexes 813 may improve the speed of data retrieval operations in the geographic database 113. In one embodiment, the indexes 813 may be used to quickly locate data without having to search every row in the geographic database 113 every time it is accessed. For example, in one embodiment, the indexes 813 can be a spatial index of the polygon points associated with stored feature polygons.

In exemplary embodiments, the road segment data records 805 are links or segments representing roads, streets, or paths, as can be used in the calculated route or recorded route information for determination of one or more personalized routes. The node data records 803 are end points corresponding to the respective links or segments of the road segment data records 805. The road link data records 805 and the node data records 803 represent a road network, such as used by vehicles, cars, and/or other entities. In addition, the geographic database 113 can contain path segment and node data records or other data that represent 3D paths around 3D map features (e.g., terrain features, buildings, other structures, etc.) that occur above street level, such as when routing or representing flightpaths of aerial vehicles (e.g., aerial vehicles 101), for example.

The road/link segments and nodes can be associated with attributes, such as geographic coordinates, street names, address ranges, speed limits, turn restrictions at intersections, and other navigation related attributes, as well as POIs, such as gasoline stations, hotels, restaurants, museums, stadiums, offices, automobile dealerships, auto repair shops, buildings, stores, parks, etc. The geographic database 113 can include data about the POIs and their respective locations in the POI data records 807. The geographic database 113 can also include data about places, such as cities, towns, or other communities, and other geographic features, such as bodies of water, mountain ranges, etc. Such place or feature data can be part of the POI data records 807 or can be associated with POIs or POI data records 807 (such as a data point used for displaying or representing a position of a city).

In one embodiment, the geographic database 113 can also include environmental noise data records 809 for the digital map data representing mapped the environmental noise sources, and/or any other related data as described in the embodiments above. The environmental noise digital map can also store model data (e.g., 3D object models) of the environmental noise sources for facilitate creating an aerial vehicle flight path or route over the environmental noise sources. In one embodiment, the 3D model data of the environmental noise sources can be created from LiDAR, aerial/satellite-based 3D sensor data, and/or other 3D sensor data collected for a geographic area. For example, mobile mapping vehicles equipped with LiDAR and/or equivalent sensors can provide 3D model data. The environmental noise map data can also be obtained with portable or smaller mapping devices/vehicles used to access the environmental noise sources for scanning or mapping. In one embodiment, the environmental noise data records 809 can be associated with one or more of the node records 803, road segment records 805, and/or POI data records 807 so that the mapped environmental noise sources can inherit characteristics, properties, metadata, etc. of the associated records (e.g., location, address, POI type, etc.). In one embodiment, the system 100 (e.g., via the aerial vehicle routing platform 111 can use the additional characteristics, properties, metadata, etc. to generate noise-driven aerial vehicle routes. In one embodiment, the environmental noise data records 809 can include a data layer for storing real-time data on the environmental noise sources to support aerial vehicle travel according to the embodiments described herein.

In one embodiment, the system 100 is capable of generating noise-driven aerial vehicle routes using the digital map data and/or real-time data stored in the geographic database 113. The resulting routing and guidance can be stored in the aerial vehicle routing data records 811. By way of example, the routes stored in the aerial vehicle routing data records 811 can be created for individual 3D flightpaths or routes as they are requested by aerial vehicles or their operators. In this way, previously generated noise-driven routes can be reused for future aerial vehicle travel over the environmental noise sources to the same target location.

In one embodiment, the noise-driven routes stored in the aerial vehicle routing data records 811 can be specific to characteristics of the aerial vehicle 101 (e.g., aerial vehicle type, size, supported modes of operation) and/or other characteristics of the noise-driven route. In addition, the noise-driven routes generated according to the embodiments described herein can be based on contextual parameters (e.g., time-of-day, day-of-week, season, etc.).

In one embodiment, the geographic database 113 can be maintained by the services platform 117 and/or any of the services 119 of the services platform 117 (e.g., a map developer). The map developer can collect geographic data to generate and enhance the geographic database 113. There can be different ways used by the map developer to collect data. These ways can include obtaining data from other sources, such as municipalities or respective geographic authorities. In addition, the map developer can employ aerial vehicles (e.g., using the embodiments of the privacy-routing process described herein) or field vehicles (e.g., mapping aerial vehicles or vehicles equipped with mapping sensor arrays, e.g., LiDAR) to travel along roads and/or within buildings/structures throughout the geographic region to observe features and/or record information about them, for example. Also, remote sensing, such as aerial or satellite photography or other sensor data, can be used.

The geographic database 113 can be a master geographic database stored in a format that facilitates updating, maintenance, and development. For example, the master geographic database or data in the master geographic database can be in an Oracle spatial format or other spatial format, such as for development or production purposes. The Oracle spatial format or development/production database can be compiled into a delivery format, such as a geographic data files (GDF) format. The data in the production and/or delivery formats can be compiled or further compiled to form geographic database products or databases, which can be used in end user navigation devices or systems.

For example, geographic data is compiled (such as into a platform specification format (PSF) format) to organize and/or configure the data for performing navigation-related functions and/or services, such as route calculation, route guidance, map display, speed calculation, distance and travel time functions, and other functions, by a navigation capable device or vehicle, such as by the aerial vehicle 101, for example. The navigation-related functions can correspond to 3D flightpath or navigation, 3D route planning for package delivery, or other types of navigation. The compilation to produce the end user databases can be performed by a party or entity separate from the map developer. For example, a customer of the map developer, such as a navigation device developer or other end user device developer, can perform compilation on a received geographic database in a delivery format to produce one or more compiled navigation databases.

The processes described herein for providing environmental noise source mapping and noise-driven routing may be advantageously implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. Such exemplary hardware for performing the described functions is detailed below.

Figure 9:
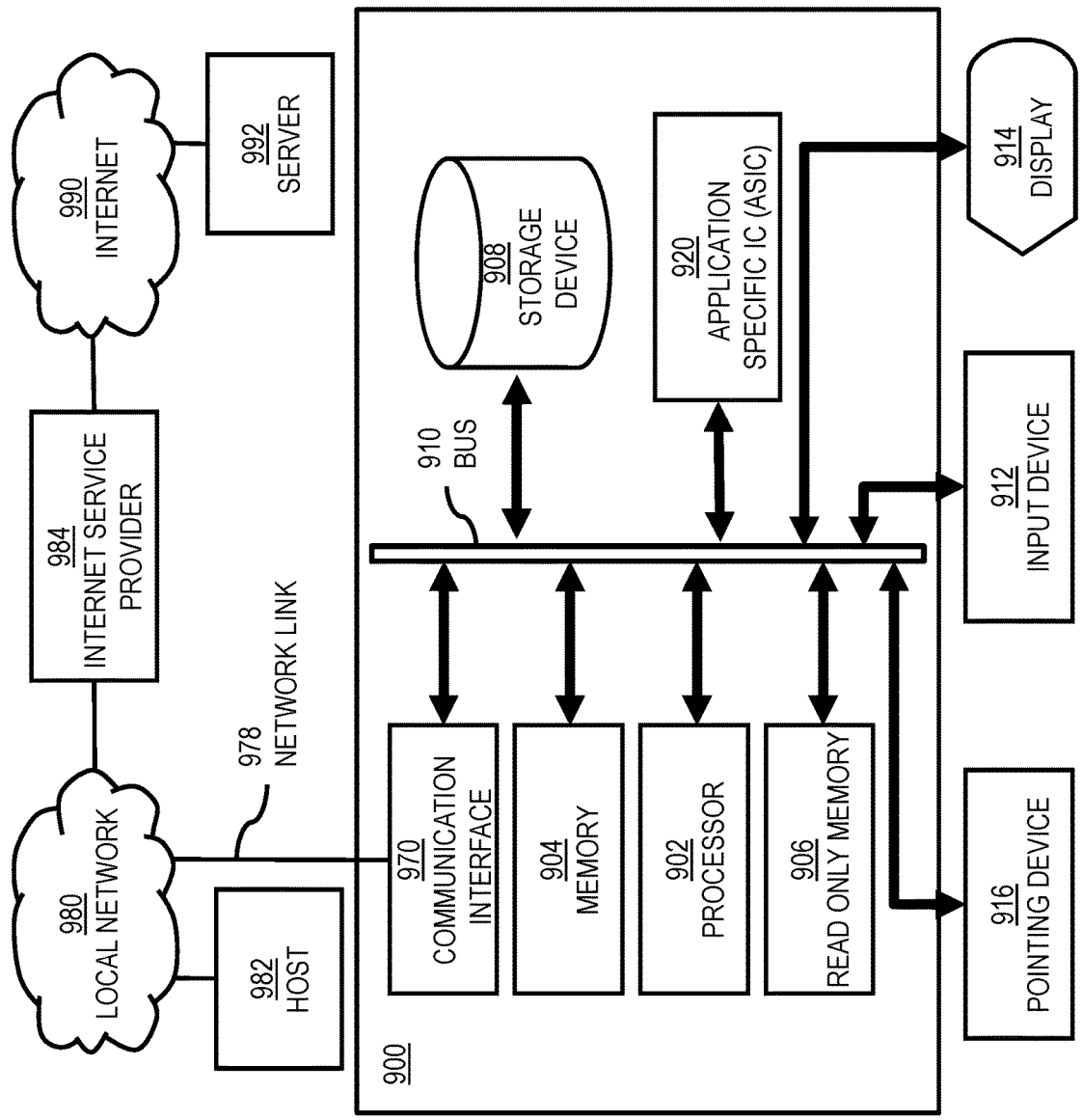
FIG. 9 is a diagram of hardware that can be used to implement an embodiment.

FIG. 9 illustrates a computer system 900 upon which an embodiment of the invention may be implemented. Computer system 900 is programmed (e.g., via computer program code or instructions) to provide environmental noise source mapping and noise-driven routing as described herein and includes a communication mechanism such as a bus 910 for passing information between other internal and external components of the computer system 900. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range.

A bus 910 includes one or more parallel conductors of information so that information is transferred quickly among devices coupled to the bus 910. One or more processors 902 for processing information are coupled with the bus 910.

A processor 902 performs a set of operations on information as specified by computer program code related to providing environmental noise source mapping and noise-driven routing. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 910 and placing information on the bus 910. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 902, such as a sequence of operation codes, constitute processor instructions, also called computer system instructions or, simply, computer instructions. The processors 902 may be implemented as mechanical, electrical, magnetic, optical, chemical or quantum components, among others, alone or in combination.

Computer system 900 also includes a memory 904 coupled to bus 910. The memory 904, such as a random access memory (RAM) or other dynamic storage device, stores information including processor instructions for providing environmental noise source mapping and noise-driven routing. Dynamic memory allows information stored therein to be changed by the computer system 900. RAM allows a unit of information stored at a location called a memory address to be stored and retrieved independently of information at neighboring addresses. The memory 904 is also used by the processor 902 to store temporary values during execution of processor instructions. The computer system 900 also includes a read only memory (ROM) 906 or other static storage device coupled to the bus 910 for storing static information, including instructions, that is not changed by the computer system 900. Some memory is composed of volatile storage that loses the information stored thereon when power is lost. Also coupled to bus 910 is a non-volatile (persistent) storage device 908, such as a magnetic disk, optical disk or flash card, for storing information, including instructions, that persists even when the computer system 900 is turned off or otherwise loses power.

Information, including instructions for providing environmental noise source mapping and noise-driven routing, is provided to the bus 910 for use by the processor from an external input device 912, such as a keyboard containing alphanumeric keys operated by a human user, or a sensor. A sensor detects conditions in its vicinity and transforms those detections into physical expression compatible with the measurable phenomenon used to represent information in computer system 900. Other external devices coupled to bus 910, used primarily for interacting with humans, include a display device 914, such as a cathode ray tube (CRT) or a liquid crystal display (LCD), or plasma screen or printer for presenting text or images, and a pointing device 916, such as a mouse or a trackball or cursor direction keys, or motion sensor, for controlling a position of a small cursor image presented on the display 914 and issuing commands associated with graphical elements presented on the display 914. In some embodiments, for example, in embodiments in which the computer system 900 performs all functions automatically without human input, one or more of external input device 912, display device 914 and pointing device 916 is omitted.

In the illustrated embodiment, special purpose hardware, such as an application specific integrated circuit (ASIC) 920, is coupled to bus 910. The special purpose hardware is configured to perform operations not performed by processor 902 quickly enough for special purposes. Examples of application specific ICs include graphics accelerator cards for generating images for display 914, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 900 also includes one or more instances of a communications interface 970 coupled to bus 910. Communication interface 970 provides a one-way or two-way communication coupling to a variety of external devices that operate with their own processors, such as printers, scanners and external disks. In general the coupling is with a network link 978 that is connected to a local network 980 to which a variety of external devices with their own processors are connected. For example, communication interface 970 may be a parallel port or a serial port or a universal serial bus (USB) port on a personal computer. In some embodiments, communications interface 970 is an integrated services digital network (ISDN) card or a digital subscriber line (DSL) card or a telephone modem that provides an information communication connection to a corresponding type of telephone line. In some embodiments, a communication interface 970 is a cable modem that converts signals on bus 910 into signals for a communication connection over a coaxial cable or into optical signals for a communication connection over a fiber optic cable. As another example, communications interface 970 may be a local area network (LAN) card to provide a data communication connection to a compatible LAN, such as Ethernet. Wireless links may also be implemented. For wireless links, the communications interface 970 sends or receives or both sends and receives electrical, acoustic or electromagnetic signals, including infrared and optical signals, that carry information streams, such as digital data. For example, in wireless handheld devices, such as mobile telephones like cell phones, the communications interface 970 includes a radio band electromagnetic transmitter and receiver called a radio transceiver. In certain embodiments, the communications interface 970 enables connection to the communication network 115 for providing environmental noise source mapping and noise-driven routing.

The term computer-readable medium is used herein to refer to any medium that participates in providing information to processor 902, including instructions for execution. Such a medium may take many forms, including, but not limited to, non-volatile media, volatile media and transmission media. Non-volatile media include, for example, optical or magnetic disks, such as storage device 908. Volatile media include, for example, dynamic memory 904. Transmission media include, for example, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, any other memory chip or cartridge, a carrier wave, or any other medium from which a computer can read.

FIG. 10 illustrates a chip set 1000 upon which an embodiment of the invention may be implemented. Chip set 1000 is programmed to provide environmental noise source mapping and noise-driven routing as described herein and includes, for instance, the processor and memory components described with respect to FIG. 9 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set can be implemented in a single chip.

In one embodiment, the chip set 1000 includes a communication mechanism such as a bus 1001 for passing information among the components of the chip set 1000. A processor 1003 has connectivity to the bus 1001 to execute instructions and process information stored in, for example, a memory 1005. The processor 1003 may include one or more processing cores with each core configured to perform independently. A multi-core processor enables multiprocessing within a single physical package. Examples of a multi-core processor include two, four, eight, or greater numbers of processing cores. Alternatively or in addition, the processor 1003 may include one or more microprocessors configured in tandem via the bus 1001 to enable independent execution of instructions, pipelining, and multithreading. The processor 1003 may also be accompanied with one or more specialized components to perform certain processing functions and tasks such as one or more digital signal processors (DSP) 1007, or one or more application-specific integrated circuits (ASIC) 1009. A DSP 1007 typically is configured to process real-world signals (e.g., sound) in real time independently of the processor 1003. Similarly, an ASIC 1009 can be configured to performed specialized functions not easily performed by a general purposed processor. Other specialized components to aid in performing the inventive functions described herein include one or more field programmable gate arrays (FPGA) (not shown), one or more controllers (not shown), or one or more other special-purpose computer chips.

The processor 1003 and accompanying components have connectivity to the memory 1005 via the bus 1001. The memory 1005 includes both dynamic memory (e.g., RAM, magnetic disk, writable optical disk, etc.) and static memory (e.g., ROM, CD-ROM, etc.) for storing executable instructions that when executed perform the inventive steps described herein to provide environmental noise source mapping and noise-driven routing. The memory 1005 also stores the data associated with or generated by the execution of the inventive steps.

Figure 11:
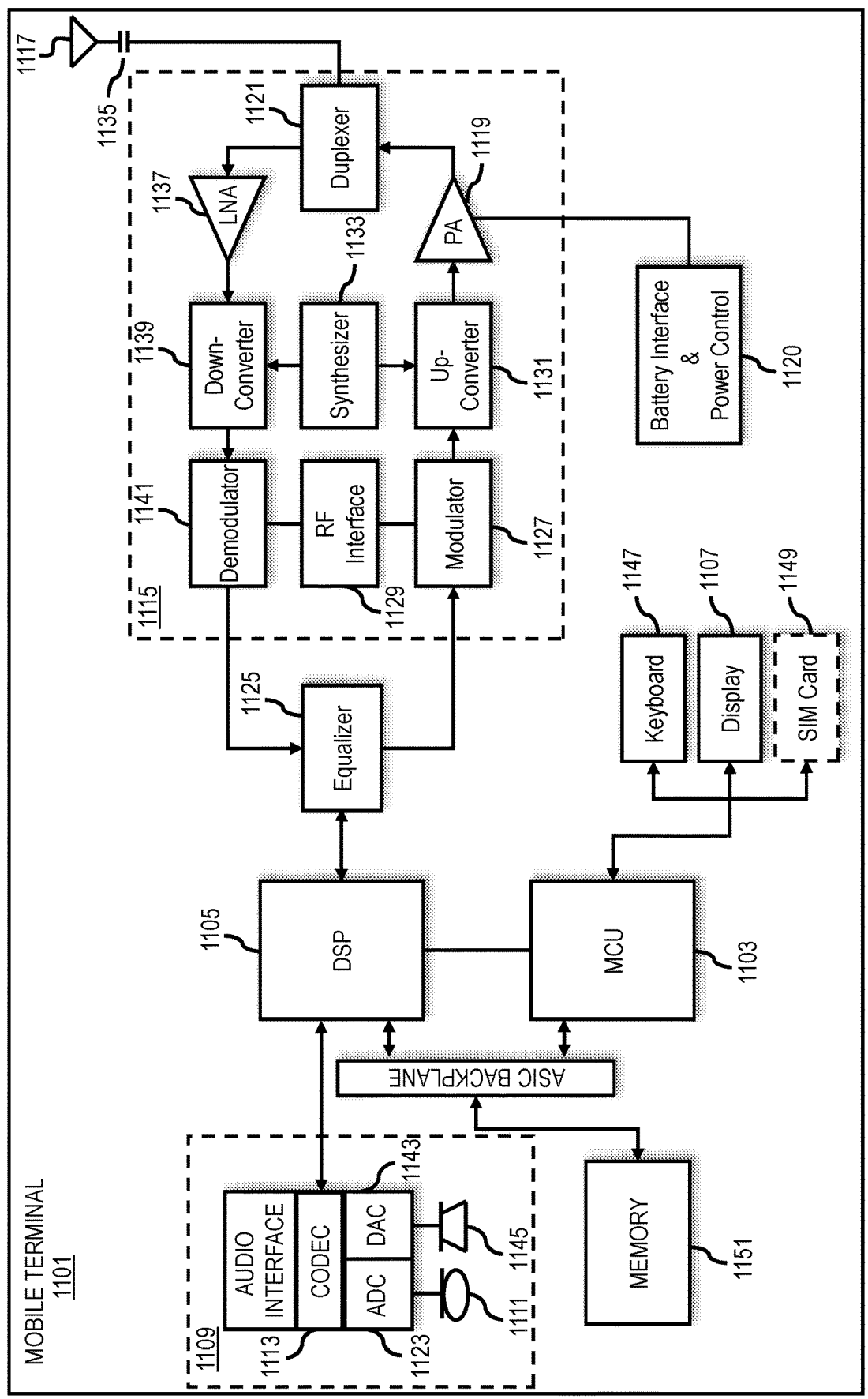
FIG. 11 is a diagram of a mobile terminal (e.g., handset or aerial vehicle or part thereof) that can be used to implement an embodiment.

FIG. 11 is a diagram of exemplary components of a mobile terminal 1101 (e.g., client device such as the UE 123 or aerial vehicle or part thereof) capable of operating in the system of FIG. 1, according to one embodiment. Generally, a radio receiver is often defined in terms of front-end and back-end characteristics. The front-end of the receiver encompasses all of the Radio Frequency (RF) circuitry whereas the back-end encompasses all of the base-band processing circuitry. Pertinent internal components of the telephone include a Main Control Unit (MCU) 1103, a Digital Signal Processor (DSP) 1105, and a receiver/transmitter unit including a microphone gain control unit and a speaker gain control unit. A main display unit 1107 provides a display to the user in support of various applications and mobile terminal functions that offer automatic contact matching. An audio function circuitry 1109 includes a microphone 1111 and microphone amplifier that amplifies the speech signal output from the microphone 1111. The amplified speech signal output from the microphone 1111 is fed to a coder/decoder (CODEC) 1113.

A radio section 1115 amplifies power and converts frequency in order to communicate with a base station, which is included in a mobile communication system, via antenna 1117. The power amplifier (PA) 1119 and the transmitter/modulation circuitry are operationally responsive to the MCU 1103, with an output from the PA 1119 coupled to the duplexer 1121 or circulator or antenna switch, as known in the art. The PA 1119 also couples to a battery interface and power control unit 1120.

In use, a user of mobile terminal 1101 speaks into the microphone 1111 and his or her voice along with any detected background noise is converted into an analog voltage. The analog voltage is then converted into a digital signal through the Analog to Digital Converter (ADC) 1123. The control unit 1103 routes the digital signal into the DSP 1105 for processing therein, such as speech encoding, channel encoding, encrypting, and interleaving. In one embodiment, the processed voice signals are encoded, by units not separately shown, using a cellular transmission protocol such as global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wireless fidelity (WiFi), satellite, and the like.

The encoded signals are then routed to an equalizer 1125 for compensation of any frequency-dependent impairments that occur during transmission though the air such as phase and amplitude distortion. After equalizing the bit stream, the modulator 1127 combines the signal with a RF signal generated in the RF interface 1129. The modulator 1127 generates a sine wave by way of frequency or phase modulation. In order to prepare the signal for transmission, an up-converter 1131 combines the sine wave output from the modulator 1127 with another sine wave generated by a synthesizer 1133 to achieve the desired frequency of transmission. The signal is then sent through a PA 1119 to increase the signal to an appropriate power level. In practical systems, the PA 1119 acts as a variable gain amplifier whose gain is controlled by the DSP 1105 from information received from a network base station. The signal is then filtered within the duplexer 1121 and optionally sent to an antenna coupler 1135 to match impedances to provide maximum power transfer. Finally, the signal is transmitted via antenna 1117 to a local base station. An automatic gain control (AGC) can be supplied to control the gain of the final stages of the receiver. The signals may be forwarded from there to a remote telephone which may be another cellular telephone, other mobile phone or a land-line connected to a Public Switched Telephone Network (PSTN), or other telephony networks.

Voice signals transmitted to the mobile terminal 1101 are received via antenna 1117 and immediately amplified by a low noise amplifier (LNA) 1137. A down-converter 1139 lowers the carrier frequency while the demodulator 1141 strips away the RF leaving only a digital bit stream. The signal then goes through the equalizer 1125 and is processed by the DSP 1105. A Digital to Analog Converter (DAC) 1143 converts the signal and the resulting output is transmitted to the user through the speaker 1145, all under control of a Main Control Unit (MCU) 1103—which can be implemented as a Central Processing Unit (CPU) (not shown).

The MCU 1103 receives various signals including input signals from the keyboard 1147. The keyboard 1147 and/or the MCU 1103 in combination with other user input components (e.g., the microphone 1111) comprise a user interface circuitry for managing user input. The MCU 1103 runs a user interface software to facilitate user control of at least some functions of the mobile terminal 1101 to provide environmental noise source mapping and noise-driven routing. The MCU 1103 also delivers a display command and a switch command to the display 1107 and to the speech output switching controller, respectively. Further, the MCU 1103 exchanges information with the DSP 1105 and can access an optionally incorporated SIM card 1149 and a memory 1151. In addition, the MCU 1103 executes various control functions required of the mobile station 1101. The DSP 1105 may, depending upon the implementation, perform any of a variety of conventional digital processing functions on the voice signals. Additionally, DSP 1105 determines the background noise level of the local environment from the signals detected by microphone 1111 and sets the gain of microphone 1111 to a level selected to compensate for the natural tendency of the user of the mobile terminal 1101.

The CODEC 1113 includes the ADC 1123 and DAC 1143. The memory 1151 stores various data including call incoming tone data and is capable of storing other data including music data received via, e.g., the global Internet. The software module could reside in RAM memory, flash memory, registers, or any other form of writable computer-readable storage medium known in the art including non-transitory computer-readable storage medium. For example, the memory device 1151 may be, but not limited to, a single memory, CD, DVD, ROM, RAM, EEPROM, optical storage, or any other non-volatile or non-transitory storage medium capable of storing digital data.

An optionally incorporated SIM card 1149 carries, for instance, important information, such as the cellular phone number, the carrier supplying service, subscription details, and security information. The SIM card 1149 serves primarily to identify the mobile terminal 1101 on a radio network. The card 1149 also contains a memory for storing a personal telephone number registry, text messages, and user specific mobile terminal settings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method for routing an aerial vehicle based on a relative noise impact comprising:
   retrieving environmental noise map data for a geographic area, wherein the environmental noise map data indicates existing noise levels measured in the geographic area,
   determining a vehicle noise characteristic of the aerial vehicle, wherein the aerial vehicle is equipped to operate in a noise-driven routing mode such that a noise characteristic of the aerial vehicle is less than an existing noise level in a portion of the geographic area, a music-adverse routing mode for avoiding a portion of the geographic area with a relative high level of music, and a silence-adverse routing mode for avoiding a portion of the geographic area with no or a relative low level of sound;
   generating a route for the aerial vehicle over the geographic area based on the relative noise impact of the aerial vehicle while operating over the geographic area; and
   monitoring a measured noise impact of the aerial vehicle as the aerial vehicle flies along the route, wherein the measured noise impact is determined using one or more audio sensors located on the ground level,
   wherein the relative noise impact is computed based on the vehicle noise characteristic relative to the existing noise levels of the environmental noise map data for portions of the geographic area under the route of the aerial vehicle.

2. The method of claim 1, wherein the route is generated to minimize the relative noise impact of the aerial vehicle with respect to a noise measurement taken at a ground level.

3. The method of claim 2, wherein the relative noise impact is minimized by generating the route to fly over the portions of the geographic area where the existing noise levels are greater than the vehicle noise characteristic by a threshold value.

4. The method of claim 2, wherein the relative noise impact is minimized by generating the route to fly at an altitude at which the existing noise levels are greater than the vehicle noise characteristic as heard at the ground level by a threshold value.

5. The method of claim 1, wherein the route is among a plurality of candidate routes generated based on the relative noise impact, the method further comprising:
   ranking the plurality of candidate routes based on one or more ranking criteria; and
   presenting the ranked plurality of candidate routes in a user interface.

6. The method of claim 5, wherein the one or more ranking criteria include at least one of: fastest, shortest, least noise impact on the ground level, or a combination thereof.

7. The method of claim 1, further comprising:
   updating the environmental noise map data, the vehicle noise characteristic, or a combination thereof based on the measured noise impact of the aerial vehicle.

8. The method of claim 1, further comprising:
   monitoring one or more real-time parameters that can affect the existing noise level, the vehicle noise characteristic, or a combination thereof; and
   updating the route in real time based on the one or more real-time parameters.

9. The method of claim 8, wherein the one or more real-time parameters include at least one of:
   a change in wind direction;
   a beginning or an ending of an event; and
   a change in traffic.

10. The method of claim 1, wherein the environmental noise map data is generated based on at least one of:
    a road network categorization for roads in the geographic area;
    live traffic data for the roads in the geographic area;
    a people density in the geographic area;
    sound measurement data collected in the geographic area; and
    a calendar of events occurring in the geographic area.

11. An apparatus for routing an aerial vehicle based on a relative noise impact comprising:
    at least one processor; and
    at least one memory including computer program code for one or more programs,
    the at least one memory and the computer program code configured to, with the at least one processor, cause the apparatus to:
    retrieve environmental noise map data for a geographic area, wherein the environmental noise map data indicates existing noise levels measured in the geographic area,
    determine a vehicle noise characteristic of the aerial vehicle, wherein the aerial vehicle is equipped to operate in a noise-driven routing mode such that a noise characteristic of the aerial vehicle is less than an existing noise level in a portion of the geographic area, a music-adverse routing mode for avoiding a portion of the geographic area with a relative high level of music, and a silence-adverse routing mode for avoiding a portion of the geographic area with no or a relative low level of sound;

generate a route for the aerial vehicle over the geographic area based on the relative noise impact of the aerial vehicle while operating over the geographic area; and monitor a measured noise impact of the aerial vehicle as the aerial vehicle flies along the route, wherein the measured noise impact is determined using one or more audio sensors located on the ground level, wherein the relative noise impact is computed based on the vehicle noise characteristic relative to the existing noise levels of the environmental noise map data for portions of the geographic area under the route of the aerial vehicle.

12. The apparatus of claim 11, wherein the route is among a plurality of candidate routes generated based on the relative noise impact, and the apparatus is further caused to:

rank the plurality of candidate routes based on one or more ranking criteria; and present the ranked plurality of candidate routes in a user interface.

13. The apparatus of claim 12, wherein the route is generated to minimize the relative noise impact of the aerial vehicle with respect to a noise measurement taken at a ground level.

14. The apparatus of claim 13, wherein the relative noise impact is minimized by generating the route to fly over the portions of the geographic area where the existing noise levels are greater than the vehicle noise characteristic by a threshold value.

15. The apparatus of claim 13, wherein the relative noise impact is minimized by generating the route to fly at an altitude at which the existing noise levels are greater than the vehicle noise characteristic as heard at the ground level by a threshold value.

16. A non-transitory computer-readable storage medium for routing an aerial vehicle based on a relative noise impact, carrying one or more sequences of one or more instructions which, when executed by one or more processors, cause an apparatus to perform:

retrieving environmental noise map data for a geographic area, wherein the environmental noise map data indicates existing noise levels measured in the geographic area, determining a vehicle noise characteristic of the aerial vehicle, wherein the aerial vehicle is equipped to operate in a noise-driven routing mode such that a noise characteristic of the aerial vehicle is less than an existing noise level in a portion of the geographic area, a music-adverse routing mode for avoiding a portion of the geographic area with a relative high level of music, and a silence-adverse routing mode for avoiding a portion of the geographic area with no or a relative low level of sound;

generating a route for the aerial vehicle over the geographic area based on the relative noise impact of the aerial vehicle while operating over the geographic area; and monitoring a measured noise impact of the aerial vehicle as the aerial vehicle flies along the route, wherein the measured noise impact is determined using one or more audio sensors located on the ground level, wherein the relative noise impact is computed based on the vehicle noise characteristic relative to the existing noise levels of the environmental noise map data for portions of the geographic area under the route of the aerial vehicle.

17. The non-transitory computer-readable storage medium of claim 16, wherein the route is generated to minimize the relative noise impact of the aerial vehicle with respect to a noise measurement taken at a ground level.

18. The non-transitory computer-readable storage medium of claim 17, wherein the relative noise impact is minimized by generating the route to fly over the portions of the geographic area where the existing noise levels are greater than the vehicle noise characteristic by a threshold value.

19. The non-transitory computer-readable storage medium of claim 17, wherein the at least one mode of operation includes a flying mode, a surface mode, a submersible mode, or a combination thereof.

* * * * *